US006978015B1

(12) United States Patent
Erickson et al.

(10) Patent No.: US 6,978,015 B1
(45) Date of Patent: Dec. 20, 2005

(54) METHOD AND APPARATUS FOR COOPERATIVE DIAGNOSIS OF IMPAIRMENTS AND MITIGATION OF DISTURBERS IN COMMUNICATION SYSTEMS

(75) Inventors: Mark Alan Erickson, San Bruno, CA (US); Ioannis Kanellakopoulos, Cupertino, CA (US); John Josef Hench, San Jose, CA (US); Sunil C. Shah, Los Altos, CA (US); James W. Waite, Los Gatos, CA (US); Michail Tsatsanis, Santa Clara, CA (US); Gurcan Aral, Cupertino, CA (US)

(73) Assignee: Tokyo Electron Limited, Tokyo (JP)

( * ) Notice: Subject to any disclaimer, the term of this patent is extended or adjusted under 35 U.S.C. 154(b) by 866 days.

(21) Appl. No.: 09/710,579

(22) Filed: Nov. 10, 2000

Related U.S. Application Data

(60) Provisional application No. 60/215,680, filed on Jun. 30, 2000, provisional application No. 60/215,159, filed on Jun. 30, 2000, provisional application No. 60/183,675, filed on Feb. 18, 2000, provisional application No. 60/181,125, filed on Feb. 8, 2000, provisional application No. 60/165,399, filed on Nov. 11, 1999, provisional application No. 60/164,986, filed on Nov. 11, 1999.

(51) Int. Cl.⁷ .............................................. H04M 1/76

(52) U.S. Cl. .................. 379/417; 379/399.01; 379/414; 375/254; 375/346

(58) Field of Search ............................... 375/254, 346; 379/93.01, 93.05, 399.01, 417, 414

(56) References Cited

U.S. PATENT DOCUMENTS

| | | |
|---|---|---|
| 3,814,868 A | 6/1974 | Bradley |
| 4,649,505 A | 3/1987 | Zinser, Jr. et al. |
| 4,669,113 A | 5/1987 | Ash et al. |
| 4,669,505 A | 6/1987 | Nelson et al. |
| 4,715,064 A | 12/1987 | Claessen |
| 4,760,596 A | 7/1988 | Agrawal et al. |
| 4,987,569 A | 1/1991 | Ling et al. |
| 5,063,351 A | 11/1991 | Goldthorp et al. |
| 5,157,690 A | 10/1992 | Buttle |
| 5,226,041 A | 7/1993 | Waclawsky et al. |
| 5,319,636 A | 6/1994 | Long et al. |
| 5,329,547 A | 7/1994 | Ling |
| 5,343,461 A | 8/1994 | Barton et al. |
| 5,406,552 A | 4/1995 | Long et al. |
| 5,521,971 A | 5/1996 | Key et al. |
| 5,548,222 A | 8/1996 | Jensen et al. |
| 5,761,614 A | 6/1998 | Leitch et al. |
| 5,848,151 A | 12/1998 | Boudy |
| 5,862,157 A | 1/1999 | Bessios |
| 5,880,959 A | 3/1999 | Shah et al. |
| 5,887,032 A | 3/1999 | Cioffi |

(Continued)

FOREIGN PATENT DOCUMENTS

EP          0917314 A2     5/1999

(Continued)

OTHER PUBLICATIONS

Lennart Ljung, IEEE Transactions on Automatic Control, vol. AC-23, No. 5, Oct. 1978, "Convergenece Analysis of Parametric Identification Methods", pp 770-783.

(Continued)

*Primary Examiner*—Bing Q. Bui
(74) *Attorney, Agent, or Firm*—Wood, Herron & Evans, L.L.P.

(57) ABSTRACT

A method that sends upstream a collection of data samples measured from a DSL line.

28 Claims, 8 Drawing Sheets

U.S. PATENT DOCUMENTS

| | | | |
|---|---|---|---|
| 5,926,538 A | 7/1999 | Deryugin et al. | |
| 5,929,896 A | 7/1999 | Goodman et al. | |
| 5,995,566 A | 11/1999 | Rickard et al. | |
| 6,055,297 A | 4/2000 | Terry | |
| 6,091,713 A | 7/2000 | Lechleider et al. | |
| 6,160,790 A | 12/2000 | Bremer | |
| 6,161,209 A | 12/2000 | Moher | |
| 6,172,970 B1 | 1/2001 | Ling et al. | |
| 6,195,594 B1 | 2/2001 | Shah et al. | |
| 6,215,855 B1 * | 4/2001 | Schneider | 379/22 |
| 6,230,062 B1 | 5/2001 | Shah | |
| 6,249,762 B1 | 6/2001 | Kirsteins et al. | |
| 6,317,495 B1 | 11/2001 | Gaikwad et al. | |
| 6,377,636 B1 | 4/2002 | Paulraj et al. | |
| 6,434,233 B1 | 8/2002 | Bjarnason et al. | |
| 6,442,495 B1 | 8/2002 | Fleming-Dahl | |
| 6,542,465 B1 * | 4/2003 | Wang | 370/232 |
| 6,674,768 B1 * | 1/2004 | Okamura | 370/468 |

FOREIGN PATENT DOCUMENTS

| | | |
|---|---|---|
| EP | 0917314 A3 | 10/2001 |
| WO | WO98/52312 A2 | 11/1998 |
| WO | WO98/52312 A3 | 11/1998 |

OTHER PUBLICATIONS

Sergio Verdu, Cambridge University Press, "Multiuser Detection", 1998, pp 1-26, 56-66, 154-175, 384-387.

Guanghan Xu et al., IEEE Transactions on Signal Processing, vol. 43, No. 12, Dec. 1995, "A Least Squares Approach to Blind Channel Identification", pp 2982-2993.

Alexandra Duel-Hallen et al., IEEE Transactions on Communications vol. 57, No. 5, May 1989, "Delayed Decision-Feedback Sequence Estimation", pp. 428-436.

K. Giridhar et al., IEEE Transactions on Communications, vol. 45, No. 4, Apr. 1997, "Nonlinear Techniques for the Joint Estimation by Cochannel Signals", pp 473-484.

Lang Tong et al., IEEE Transactions on Signal Processing, vol. 47, No. 9, Sep. 1999, "Joint Order Detection and Blind Channel Estimation by Least Squares Smoothing", pp 2345-2355.

Eric Moulines et al., IEEE Transactions on Signal Processing, vol. 43, No. 2, Feb. 1995, "Subspace Methods for the Blind Identification of Multichannel FIR Filters", pp 516-525.

Alexandra Duel-Hallen et al., IEEE Personal Communications, Apr. 1995, "Multiuser Detection for CDMA Systems", pp 46-58.

D. Godard, IEEE Transaction Communications, vol. COM-28, No. 11, Nov. 1980, "Self-Recovery Equalization and Carrier Tracking in Two-Dimensional Data Communication System", pp 1867-1875.

Lennart Ljung, PTR Prentice Hall Information and System Science Series, "System Identification, Theory for the User", Second Edition, 1999, pp 79-139, 197-279, 317-360.

Raul A. Cacas et al., Broadcasting & Cable "Current Approaches to Blind Decision Feedback Equalization", Aug. 1999, pp 1-52.

John G. Proakis, McGraw Hill Series in Electrical and Computer Engineering, Digital Communications, Third Edition, 1995, pp 267-286.

Stephen Boyd et al., "Convex Optimization", Course Reader for EE364: Introduction to Convex Optimization with Engineering Applications, Stanford University, Winter Quarter 1996-1997, pp 1-146.

Amit Mathur, Dissertation from Electrical and Computer Engineering, University of California, Santa Barbara, "Algorithms for Cochannel Source Separation and Signal Estimation", Dec. 1996, pp 1-165.

Edward A. Lee et al., Kluwer Academic Publishers, "Digital Communication", Second Edition, 1994, pp 408-424, 468-486.

Thomas Starr et al., Prentice Hall, Communication Engineering and Emerging Technologies, "Understanding Digital Subscriber Line Technology", 1999, pp 297-354.

J. Cioffi, EEE379A, Digital Communication: Signal Processing Class notes, Stanford University, pp 167-174, 194-197.

Arthur Gelb et al., "The Analytic Sciences Corporation, Applied Optimal Estimation", 1974, pp 156-179.

Simon Haykin, Prentice Hall Information and System Sciences Series, "Adaptive Filter Theory", Third Edition, 1996, pp 772-815.

Ian R. Petersen et al., Control Engineering, "Robust Kalman Filtering for Signal and Systems with Large Uncertainties", 1999, pp 35-55.

Upamanyu Madhow et al., IEEE Transactions on Communications, vol. 42, No. 12, Dec. 1994, "MMSE Interference Suppression for Direct-Sequence Spread-Spectrum CDMA" pp 3178-3188.

C. Richard Johnson, Jr. et al., Proceedings of the IEEE, vol. 86, No. 10, Oct. 1998, "Blind Equalization Using the Constant Modulus Criterion: A Review", pp 1927-1950.

P. Ciblat et al., "Asymptotic Analysis of Blind Cyclic Correlation Based Symbol Rate Estimation", Sep. 2000.

Dr. Dennis J. Rauschmayer, Macmillan Technology Series, "ADSL/VDSL Principles", 1999, pp 131-155.

Lennart Ljung, Prentice-Hall Information and System Sciences Series, "System Identification, Theory for the User", 1987, pp 141-163, 239-263.

Yaakov Bar-Shalom et al., Artech House, Inc., "Estimation and Tracking: Principles, Techniques, and Software", 1993, pp. 450-465.

International Telecommunication Union, ITU-T Telecommunication Standardization Sector of ITU, G.810, "Definitions and Terminology for Synchronization Networks", Aug. 1996, pp 1-20.

ADSL Forum Technical Report TR-024 for Network Management Working Group, "DMT Line Code Specific MIB", Jun. 1999, pp 1-7.

Craig Michael Teuscher, Dissertation submitted as requirement for the degree of Dr. of Philosophy in Engineering-Electrical Engineering and Computer Sciences, Low Power Receiver Design for Portable RF Applications: Design and Implementation of an Adaptive Multiuser Detector for an Indoor, Wideband CDMA Application, Fall 1998, pp 37, 43-52.

Claes Tidestav et al., Signals and Systems, Uppsala University, "Realizable MIMO Decision Feedback Equalizers", International Conference on Acoustics, Speech, and Signal Processing (ICASSP99) Mar. 1999, Phoenix, AZ, V.5, pp 2591-2594.

K. Sam Shanmugan et al., John Wiley & Sons, "Random Signals, Detection, Estimation and Data Analysis", pp 341-377.

Harry L. Van Trees, Massachusetts Institute of Technology, "Detection Estimation, and Modulation Theory", 1968, pp 19-163, 239-418.

PCT Search Report, PCT/US00/42097, Nov. 10, 2000, Date of Mailing: Jun. 26, 2001 (5 pgs.)

PCT Search Report, PCT/US00/30859, Nov. 10, 2000, Date of Mailing: Mar. 27, 2001 (5 pgs.)
PCT Search Report, PCT/US00/30858, Nov. 10, 2000, Date of Mailing: Mar. 16, 2001 (7 pgs.)
PCT Search Report, PCT/US00/30887, Nov. 1, 2000, Date of Mailing: Aug. 9, 2001 (24 pgs.)
PCT Search Report, PCT/US00/30967, Nov. 10, 2000, Date of Mailing: Jan. 24, 2001 (7 pgs.)
PCT Search Report, PCT/US00/31026, Nov. 1, 2000, Date of Mailing: Jan. 22, 2001 (7 pgs.)
Honig, M.L. et al, "Suppression of Near- and Far-End Crosstalk by Linear-Pre- and Post-Filerting", Selected Areas in Communications, IEEE Journal on. vol. 10 Issue 3, Apr. 1992, pp. 614-629, entire document.
Petersen, Brent R., et al., "Minimum Mean Square Equalization in Cyclostationary and Stationary Interference-Analysis and Subscriber Line Calculations", Student Member, IEEE Journal, vol. 9, No. 6, Aug. 1991, pp. 11.
Valenti, Craig F., Bellcore, "Cable Crosstalk Parameters and Models", ANSI Contribution IE1.4/97-302 Technical Subcommittee Working Group Members, Spectral Compatibility, Morristown, NJ 07960, USA, Sep. 22, 1997, pp. 8.

* cited by examiner

METHOD AND APPARATUS FOR COOPERATIVE DIAGNOSIS OF IMPAIRMENTS AND MITIGATION OF DISTURBERS IN COMMUNICATION SYSTEMS

CLAIM OF PRIORITY

This application claims the benefit of the filing date of the following Provisional U.S. patent applications:

"SPECTRAL MANAGEMENT AND OPTIMIZATION THROUGH ACCURATE IDENTIFICATION OF CROSS-TALK CHANNELS AND UNCERTAINTY", application No. 60/164,986, filed Nov. 11, 1999;

"SPECTRAL MANAGEMENT AND OPTIMIZATION THROUGH ACCURATE IDENTIFICATION OF CROSS-TALK CHANNELS AND UNCERTAINTY", application No. 60/181,125, filed on Feb. 8, 2000;

"SPECTRAL MANAGEMENT AND OPTIMIZATION THROUGH ACCURATE IDENTIFICATION OF CROSS-TALK CHANNELS AND UNCERTAINTY", application No. 60/183,675, filed on Feb. 18, 2000;

"USE OF UNCERTAINTY IN PHYSICAL LAYER SIGNAL PROCESSING IN COMMUNICATIONS", application No. 60/165,399, filed Nov. 11, 1999;

"SHARED COMPUTATIONAL RESOURCES FOR IMPROVED PERFORMANCE OF A TRANSCEIVER" application No. 60/215,159, filed on Jun. 30, 2000; and "SYSTEM LEVEL SUPPORT FOR TRANSCEIVER PERFORMANCE", application No. 60/215,680, filed on Jun. 30, 2000.

FIELD OF THE INVENTION

The field of invention relates to communications generally; and more specifically, to improving the performance of a network by sharing resources or information between a network perspective and a line perspective.

BACKGROUND

Overview

In the communications arena one of the biggest challenges is to overcome crosstalk, noise, and other disturbances that interfere with signals. Whether the signals are transmitted over wires, cable, fiber optics, wireless, or other types of communication the signals suffer from some level of interference.

Interference in the signal may lead to certain limitations of the communication system. For example in wireless systems, such as cellular phones, interference may shorten the distance at which the signal can be reliably received and the clarity of the signal. As another example, in wire systems, such as digital subscriber lines (DSL), interference may shorten the distance at which the signal can be reliably received, i.e., limit loop reach. Interference may also decrease the bit rate of the data being transferred. Providers of telecommunications services recognize the need to monitor the quality of service provided to users of their networks and to identify the causes of problems reported by their customers. This task, however, is complicated significantly by several factors.

Some of these factors include: the large number of network users, the large amount of data collected from the deployed lines, and the presence of competing providers in the same physical line plant. The coexistence of ILECs (Incumbent Local Exchange Carriers) and CLECs (Competitive Local Exchange Carriers) in the same cable binders, brought about by the federally mandated deregulation of local telecommunications markets, implies that services deployed by one carrier may be disturbing the users of another carrier, who has no information about the source of this disturbance.

It is thus highly desirable to sort through the collected data and determine whether a specific line is being disturbed by external interference, such as AM radio stations, or by internal interference, such as another DSL service, and whether that offending service belongs to the same carrier or not. Unfortunately, with today's deployed monitoring technology, carriers are extremely limited in their ability to perform such diagnoses with adequate accuracy and reliability.

The following discussion outlines in detail many of the problems of digital subscriber line (DSL) technology and potential solutions thereto. However, the discussion merely uses DSL as one example of the many communication systems (e.g., wireline, wireless, optical, cable, etc.) in which the present invention may be used. Thus the present invention should not be limited to merely DSL communication systems.

Overview with Respect to DSL

Digital Subscriber Line (DSL) networks provide high speed networking service while preserving the investment made in traditional telephone lines. FIG. 1 shows an exemplary topology of a DSL network. In the exemplary DSL network topology 100 of FIG. 1, various customer premise equipment (CPE) modems 105, 106, 107 are communicatively coupled to a central office switching center 101 via ordinary telephone lines (e.g., lines 120 through 122).

Customer premise equipment 105, 106, 107 is equipment located at the customer's location (e.g., a customer's home or office). In the exemplary network topology 100 of FIG. 1, the customer premise equipment 105, 106, 107 possesses at least one transceiver (e.g., transceiver 108 in CPE 105) that is responsible for: 1) controlling at the CPE the reception of information sent from the service provider; and 2) controlling at the CPE the transmission of information sent to the service provider.

Information that flows in the network 100 toward the customer (e.g., toward the direction of a CPE as seen in FIG. 1) has a "downstream" direction while information that flows in the network 100 away from the customer (e.g., away from a CPE as seen in FIG. 1) has an "upstream" direction. Thus it may be said that a transceiver within a CPE is responsible for controlling at the CPE the transmission of upstream information and the reception of downstream information.

Various DSL service schemes exist. For example, at a high level, DSL services are characterized according to the bandwidth allocated for a customer's upstream and downstream traffic. Services that reserve approximately equal amounts of bandwidth for a customer's upstream and downstream traffic are referred to as "symmetric DSL" while services that reserve approximately unequal amounts of bandwidth for a customer's upstream and downstream traffic are referred to as "asymmetric DSL".

Symmetric DSL (SDSL), High bit rate DSL (HDSL, HDSL-2) and ISDN DSL (IDSL) are versions of symmetric DSL. Asymmetric DSL (ADSL), Rate Adaptive DSL (RADSL), Very high bit rate DSL (VDSL), and G.Lite are versions of asymmetric DSL. Any of these DSL services (as well as other potential future DSL services that are not listed above) may be referred to as "DSL".

Note that the central office 101 includes a plurality of DSL Access Multiplexers 102, 103, 104 (DSLAMs). A DSLAM operates as a distributor of DSL services. That is, for example, DSLAM 102 forwards/collects downstream/upstream information sent from/to higher layers of a service provider's network to/from transceivers 108, 109, 110. The service provider's DSL network is controlled by a Network Management Agent (NMA) 118.

An NMA 118 is one or more software routines that monitor the operation of a network (e.g., by collecting various performance monitoring statistics sent from the DSLAMs 102, 103, 104) and controls various aspects of a network (e.g., by enabling or disabling service on a particular line). The NMA 118 shown in FIG. 1 monitors and controls the DSL network 100 by communicating with the DSLAMs through the Element Management Systems 116, 117 (EMSs). The NMA 118, as an example, may be executed as part of a network's Network Management System (NMS). An EMS effectively distributes to the DSLAMs control information sent from the NMA and forwards to the NMA 118 network performance or network status indicia sent from the DSLAMs. More details on a DSL system are provided below.

FIG. 2 shows an exemplary depiction of a receiver 201 within a DSL transceiver 208. That is, for example, transceiver 208 of FIG. 2 may be viewed as corresponding to transceiver 108 of FIG. 1 and line 220 of FIG. 2 may be viewed as corresponding to line 120 of FIG. 1. Recalling that the transceiver 208 is responsible for controlling both the transmission of upstream traffic and the reception of downstream traffic, note that receiver 201 assists the performance of the latter of these two functions.

The receiver 201 includes an equalizer 202 and a symbol detection unit 203 (which may also be referred to as a symbol detector 203). The equalizer 202 adjusts the transfer function of the receive channel such that the frequency components of the received waveform rx(t) 221 that are associated with the signal (i.e., the frequency components of the received waveform rx(t) 221 that are associated with the downstream information sent from the service provider to the transceiver 208) are enhanced with respect to the frequency components of the waveform rx(t) 221 that are not associated with the signal (i.e., the frequency components of the waveform's "noise"). For example, the signal components alone may be amplified, the noise components alone may be suppressed or a combination of both.

The symbol detection unit 203 converts the features of the equalized waveform 222 into digital 1s and 0s according to the modulation scheme employed by the particular type of DSL service being implemented. As a result of the equalizer's activity, the signal-to-noise ratio (SNR) in the receive channel is enhanced and the performance of the symbol detection unit 203 (i.e., its ability to correctly reproduce the digital information sent by the service provider) is improved.

Referring back to FIG. 1, note that the ordinary telephone lines that couple the DSLAMs and the CPEs are tightly packed together in a binder such as binder 114 and binder 115. Because ordinary telephone lines were originally designed for low speed voice/telephony communications, they are typically packed in a binder without shielding. That is, a line is not protected from receiving electromagnetic interference associated with the waveforms that appear on another line; nor are the waveforms on a line prevented from radiating so as to interfere with the waveforms that appear on another line.

The interference described above, commonly referred to as cross-talk, is viewed as noise that may corrupt the operation of the symbol detection unit 203 discussed above with respect to FIG. 2. Cross-talk typically increases as the frequencies of the waveforms on an ordinary telephone line increase.

When the ordinary telephone lines were originally installed to carry voice traffic, cross-talk was insubstantial because of the lower frequencies used to transmit voice traffic. However, as DSL is designed to provide higher speed services (as compared to traditional telephony service) over these ordinary telephone lines, cross-talk from DSL waveforms is much more severe. The more severe cross-talk frequently hampers the successful deployment of a DSL service.

SUMMARY OF INVENTION

A method that sends upstream a collection of data samples measured from a network line.

BRIEF DESCRIPTION OF THE DRAWINGS

The present invention is illustrated by way of example, and not limitation, in the Figures of the accompanying drawings in which.

DETAILED DESCRIPTION 1.0 Overview

Figure 1:
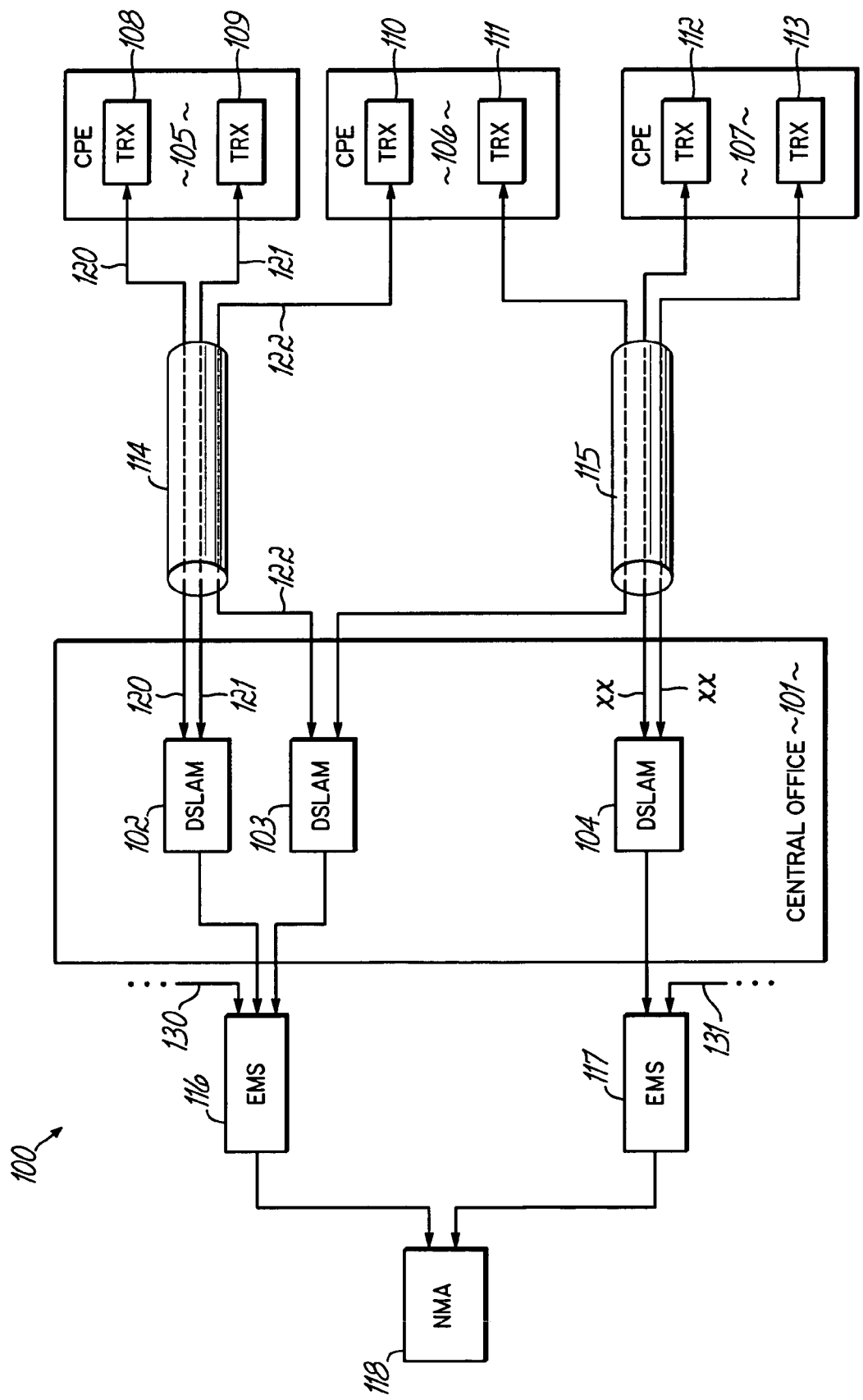
FIG. 1 shows an exemplary DSL network topology.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general purpose processor or by any combination of hardware and software. One of skill in the art will immediately appreciate that the invention can be practiced with computer system configurations other than those described below, including hand-held devices, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

2.0 Overview of General Communication Network

Figure 10:
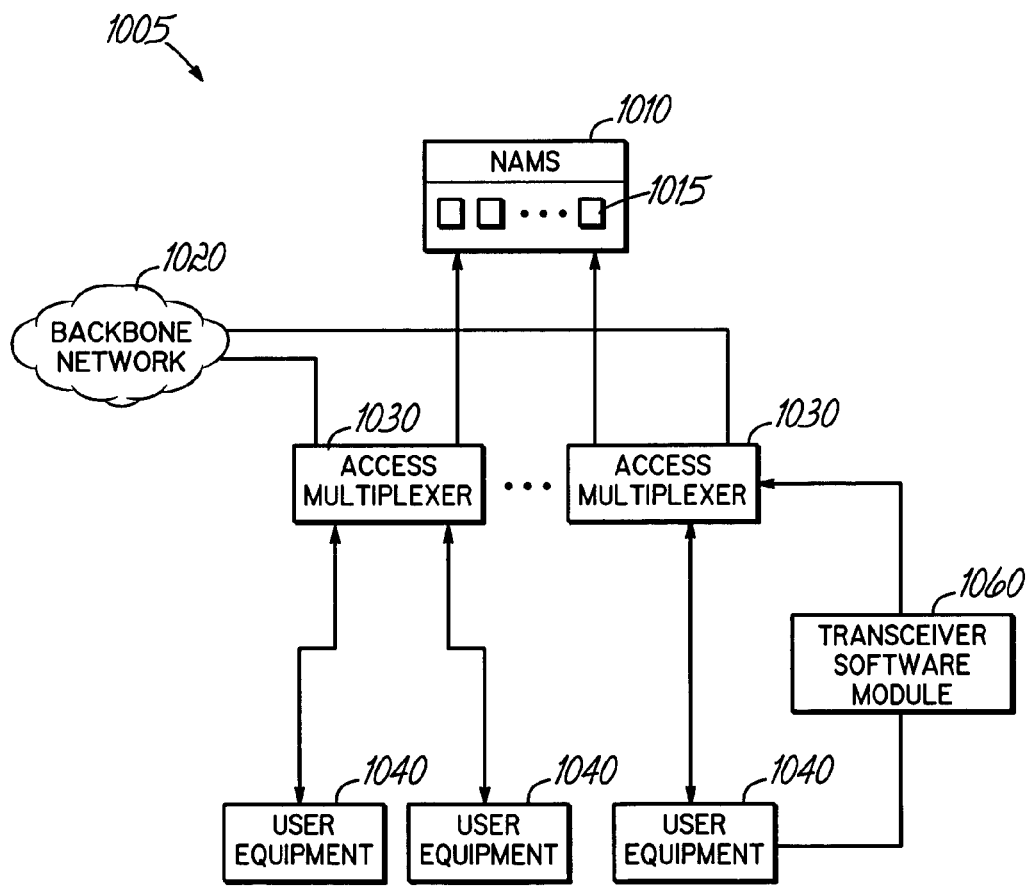
FIG. 10 illustrates an exemplary communication system 1005 that may benefit from the present invention.

The present invention is applicable to a variety of communication systems, for example: wireline, wireless, cable, and optical. FIG. 10 illustrates an exemplary communication system 1005 that may benefit from the present invention. The backbone network 1020 is generally accessed by a user through a multitude of access multiplexers 1011 such as: base stations, DSLAMs (DSL Access Mulitplexers), or switchboards. The access multiplexers 1011 communicate management data with a Network Access Management System (NAMS) 1010. The NAMS 1010 includes several management agents 1015 which are responsible for monitoring traffic patterns, transmission lines status, etc. Further, the access multiplexers 1011 communicate with the network users. The user equipment 1040 exchanges user information, such as user data and management data, with the access multiplexer 1011 in a downstream and upstream fashion. The upstream data transmission is initiated at the user equipment 1040 such that the user data is transmitted from the user equipment 1040 to the access multiplexer 1011. Conversely, the downstream data is transmitted from the access multiplexer 1011 to the user equipment 1040. User equipment 1040 may consist of various types of receivers that contain modems such as: cable modems, DSL modems, and wireless modems.

The invention described herein provides a method and system for managing the upstream and downstream data in a communication system. As such, the present invention provides management agents that may be implemented in the NAMS 1010, the access multiplexers 1011, and/or the user equipment 1040. One example of such a management agent is a system software module 1070 that may be embedded in the NAMS 1010. Another management agent that manages the data in the communication system 1005 is a transceiver software module 1060 that may be embedded in the access multiplexer 1011 and/or the user equipment 1040. Further details of the operation of modules 1070 and 1060 are described below.

For illustration purposes and in order not to obscure the present invention, an example of a communication system that may implement the present invention is a DSL communication system. As such, the following discussion, including FIG. 11, is useful to provide a general overview of the present invention and how the invention interacts with the architecture of the DSL system.

3.0 Overview of DSL Example

The present invention may be implemented in software modules or hardware that DSL equipment manufacturers may then embed in their hardware. Thus, although FIG. 11 illustrates the present invention as software, the present invention should not be limited thereto. It should also be noted that this patent application may only describe a portion or portions of the entire inventive system and that other portions are described in co-pending patent applications filed on even date herewith.

Figure 11:
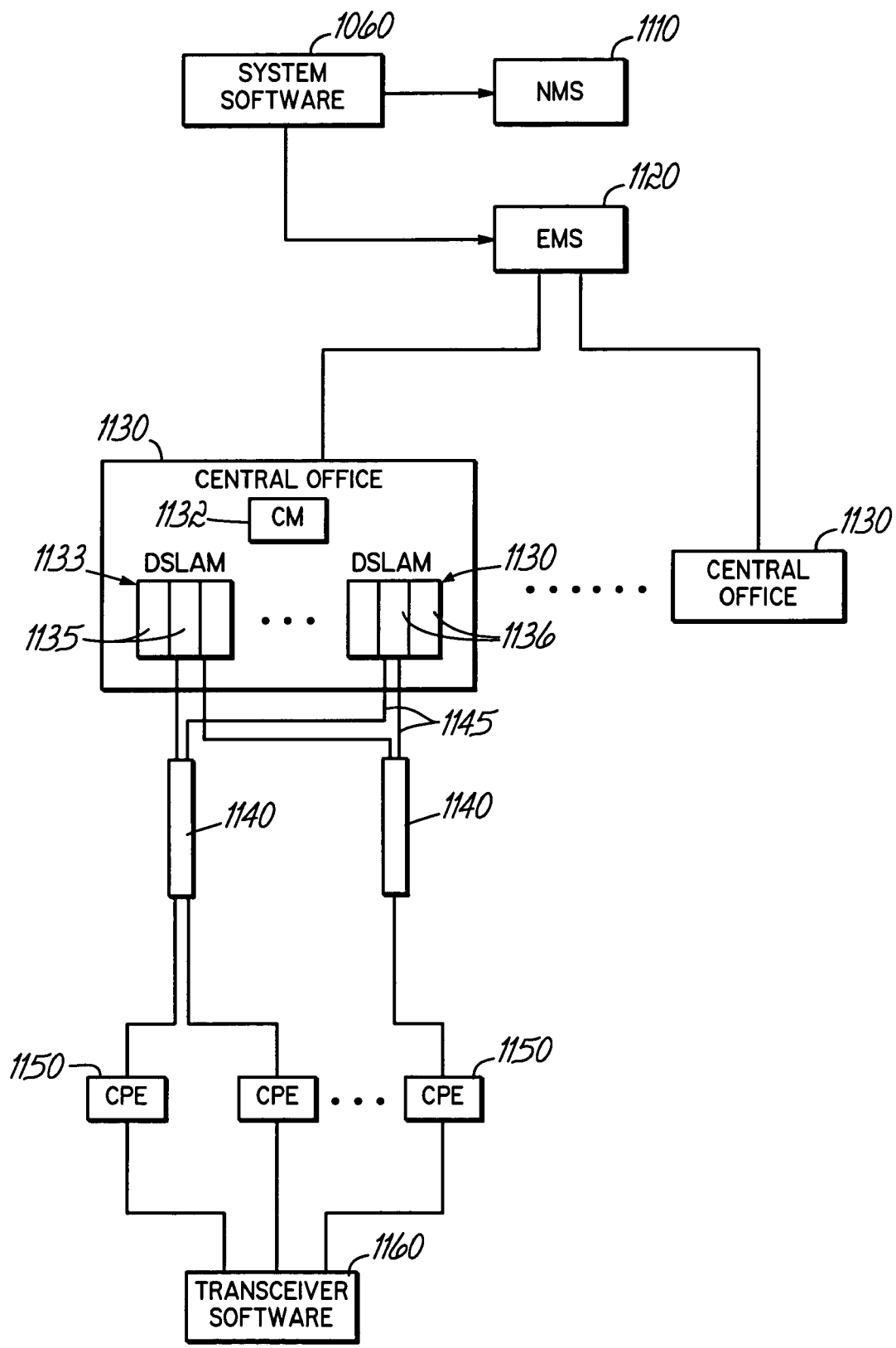
FIG. 11 illustrates a DSL system.

FIG. 11 illustrates an exemplary embodiment of the present invention as implemented in a DSL system. The DSL system consists of a network of components starting from the Network Management System (NMS) 1110 all the way down to the Customer Premise Equipment (CPE) 1150. The following is a brief description of how these components are interconnected.

The Network Management System (NMS) 1110 is a very high level component that monitors and controls various aspects of the DSL system through an Element Management System (EMS) 1120. The NMS 1110 may be connected to several Central Offices (CO) 1111 through any number of EMSs 1120. The EMS 1120 effectively distributes the control information from the NMS 1110 to the DSL Access Multiplexers (DSLAMs) 1133 and forwards to the NMS 1110 network performance or network status indicia from the DSLAMs 1133. DSLAMs 1133 reside in a Central Office (CO) 1111, usually of a telecommunications company. Alternatively, DSLAMs 1133 may reside in remote enclosures called Digital Loop Carriers (DLC). The CO 1111 may have tens or hundreds of DSLAMs 1133 and control modules (CM) 1132. A DSLAM 1133 operates as a distributor of DSL service and includes line cards 1135 and 1136 that contain CO modems. The CO modems are connected to at least one line 1145, but more frequently it contains several line cards 1135 and 1136 that are connected to several lines 1145. Usually the lines 1145 are traditional phone lines that consist of twisted wire pairs and there may be multiple lines 1145 in a binder 1140 and multiple binders in a cable. The transmission cables act as packaging and protection for the lines 1145 until the lines 1145 reach the Customer Premise Equipment (CPE) 1150. It should be noted that a DSLAM 1135 does not necessarily have to be connected to lines 1145 in a single binder 1140 and may be connected to lines in multiple binders 1140. The lines 1145 terminate at the CPE 1150 in transceivers that include CPE modems. The CPE 1150 may be part of or connected to residential equipment, for example a personal computer, and/or business equipment, for example a computer system network.

As discussed in the background section, communications systems often suffer from interference and/or impairments such as crosstalk, AM radio, power ingress noise, thermal variations, and/or other "noise" disturbers. The present invention or portions of the present invention provide the user the capability to analyze, diagnose and/or compensate for these interferences and/or impairments. It also provides the ability to predict and optimize performance of the communication system in the face of impairments.

As illustrated in FIG. 11, the transceiver software of the present invention 1160, depending upon how implemented, may provide the user with the ability to analyze, diagnose, and compensate for the interference and/or impairment patterns that may affect their line.

Also as illustrated in FIG. 11, the system software of the present invention 1170, depending upon how implemented, may provide the service provider with the ability to diagnose, analyze, and compensate for the interference and/or impairment patterns that may affect the service they are providing on a particular line. The diagnosis and analysis of the transceiver software also provide the ability to monitor other transmission lines that are not connected to the DSLAMs or NMS but share the same binders.

It should be noted that the system software of the present invention 1170 may be implemented in whole or in part on the NMS 1110 and/or EMS 1120 depending upon the preference of the particular service provider. Likewise, it should be noted that the transceiver software of the present invention 1160 may be implemented in whole or in part on the DSLAM 1133 and/or transceivers of CPE 1150 depending upon the preference of the particular user. Thus, the particular implementation of the present invention may vary, and depending upon how implemented, may provide a variety of different benefits to the user and/or service provider.

It should also be noted that the system software of the present invention 1170 and the transceiver software of the present invention 1160 may operate separately or may operate in conjunction with one another for improved benefits. As such, the transceiver software of the present invention 1160 may provide diagnostic assistance to the system software of the present invention 1170. Additionally, the system software of the present invention 1170 may provide compensation assistance to the transceiver software of the present invention 1160.

Thus, given the implementation of the present invention with respect to the DSL system example of FIG. 11, one of ordinary skill in the communications art would understand how the present invention may also be implemented in other communications systems, for example: wireline, wireless, cable, optical, and other communication systems. Further details of the present invention are provided below. Additional examples of how the present invention may be implemented in a DSL system are also provided below for illustrative purposes.

4.0 Overview of a Line Perspective and a Network Perspective

Figure 3A:
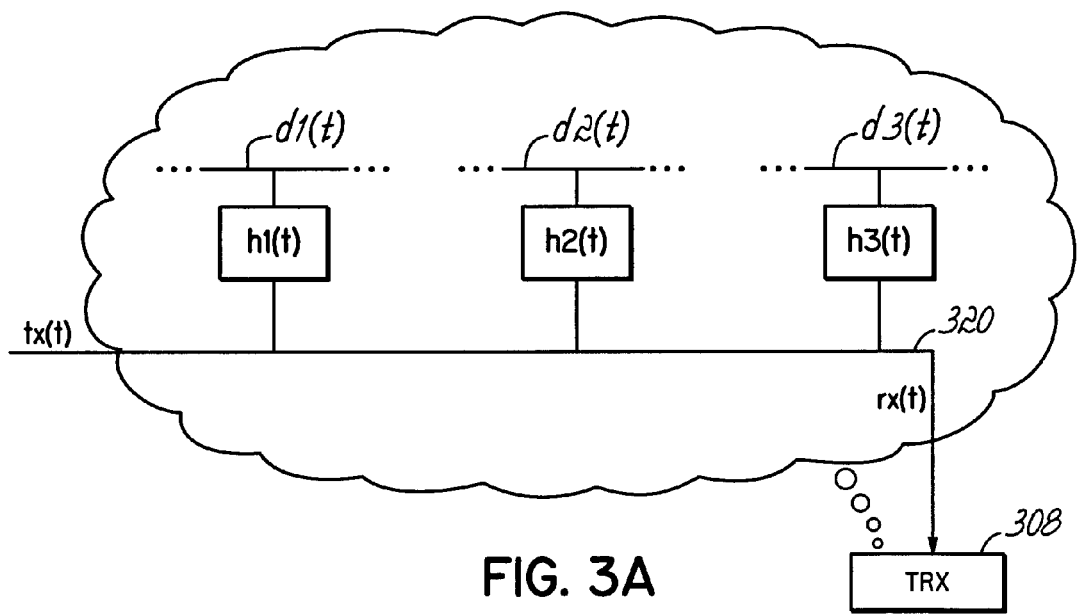
FIG. 3a shows an exemplary line perspective.
Figure 3B:
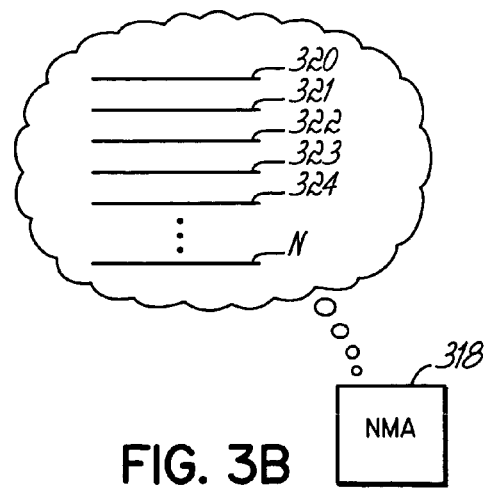
FIG. 3b shows an exemplary network perspective.

Recall from the background that cross-talk between lines in a DSL network may hamper the successful deployment of the DSL network. FIGS. 3a and 3b relate to perspectives of a DSL network that may be developed by two different network components (e.g., a transceiver 308 as seen in FIG. 3a and the NMA 318 as seen in FIG. 3b) in order to understand the causes and/or effects of cross-talk within the DSL network.

FIG. 3a shows a perspective that may be developed at the line of a DSL network (e.g., by a DSL transceiver 308). A line perspective is a collection of information that characterizes the environment of a DSL line. For example, the line perspective of line 320 in FIG. 3a includes a model for each source of cross-talk noise that disturbs signal reception on line 320. A source of cross-talk noise (e.g., a waveform on a proximate line) may be referred to as a disturber. Cross-talk noise may therefore also be referred to as disturber noise. The exemplary line perspective of FIG. 3a indicates that the DSL transceiver 308 has identified three different disturbers $d1(t)$, $d2(t)$, and $d3(t)$.

Thus, for example, disturber $d1(t)$ may correspond to a waveform on a first line, $d2(t)$ may correspond to a waveform on a second line, and $d3(t)$ may correspond to a waveform on a third line. Each disturber $d1(t)$, $d2(t)$, $d3(t)$ passes through and is processed by its corresponding co-channel $h1(t)$, $h2(t)$, and $h3(t)$. Each co-channel $h1(t)$, $h2(t)$, and $h3(t)$ represents the impulse response of the electromagnetic coupling that exists between lines that "cross-talk" with one another.

In order to improve the signal-to-noise ratio (SNR) in the transceiver's receive channel, as an example, the transceiver 308 may develop as part of its line perspective of line 320: 1) the disturber signals d1(t), d2(t), d3(t); and 2) each disturber's corresponding co-channel impulse response h1(t), h2(t), and h3(t). With this line perspective of line 320, the transceiver 380 may then at least approximate and remove disturber noise on line 320. As a result, SNR will be improved. More details as to how a line perspective may be developed are provided further below.

FIG. 3b shows another perspective of a DSL network that may be referred to as a network perspective. A network perspective is an understanding of cross-talk (or other interference) as developed through the correlation of information obtained from events observed on the lines within a network. As seen in FIG. 3b, note that a network perspective may be developed by a DSL network's NMA 318. The NMA 318 "keeps track of" events such as changes in the performance and/or configuration of each line in the DSL network that the NMA 318 exhibits control over.

By keeping track of and correlating information from these events, an understanding of the cross-talk between the network's lines (or other types of interference) may be developed. For example, if the NMA 318 observes as an event that lines 320, 321 and 323 each experienced a drop in SNR just after an increase in the service speed on line 324 was allowed, the NMA 318 can assume that line 324 presents disturber noise on lines 320, 321 and 322.

Furthermore, in light of the amount of SNR reduction that has occurred on each line, the NMA 318 can approximate the degree of cross coupling between line 324 and each of lines 320, 321 and 322. This information may be used, for example, to prevent or limit the extent of further speed increases on line 324 (so that proper operation of lines 320, 321 and 322 is ensured). More details as to how a network perspective may be developed is provided further below.

The discussion that follows demonstrates that transferring line perspective information to a network perspective and/or transferring network perspective information to a line perspective may result in the development of more accurate line and/or network perspectives and/or increased performance of the DSL network as a whole. For example, referring to FIG. 3b, if the network perspective is informed that the line perspective of line 321 includes a disturber having a frequency that corresponds to the speed of line 324, the network perspective's confidence that line 324 presents cross-talk on line 321 is increased.

As a second example, recall that a line perspective may develop an understanding of the disturbers d1(t), d2(t), d3(t) and their corresponding co-channels h1(t), h2(t), and h3(t). The computational resources available to a transceiver 308 that develops this line perspective (e.g., a microprocessor or digital signal processor (DSP) in the CPE) may be limited so that only a less detailed perspective of the disturbers and/or their corresponding co-channels can be developed.

By measuring the waveform rx(t) and/or its associated frequency spectra and then forwarding this data upstream from the transceiver 308 (e.g., to the DSLAM, EMS or NMA) more accurate models of the disturbers and/or their co-channels can be developed. Typically, the DSLAM, EMS, and NMA possess more powerful computational resources (e.g., a multi-processor processing core) than the CPE.

By executing disturber and co-channel identification routines on these more powerful computational resources, more precise characterizations of the disturber and co-channel profiles may be developed. The more precise characterizations may then be sent downstream to the transceiver 308 resulting in an improved SNR as compared to the SNR that would have been achieved by executing disturber and/or co-channel characterization sequences at the CPE alone.

The following discussion develops a deeper understanding of how the line and network perspectives of FIGS. 3a and 3b may be developed. A discussion of the information that may be exchanged between these perspectives, and the benefits derived from this exchange, follows immediately afterward. Before continuing, however, it is important to emphasize that the techniques, design strategies, improvements, advantages, etc. discussed below may be applied to network technologies other tha DSL (e.g., wireless networks, fiber optic networks, etc.). As such, a line may be viewed more generally as a communication channel that exists between a service provider and customer (e.g., a wireless link, a fiber optic cable, a copper cable, etc.).

5.0 Development of a Line Perspective

A. Improved Receiver Operation

Figure 4:
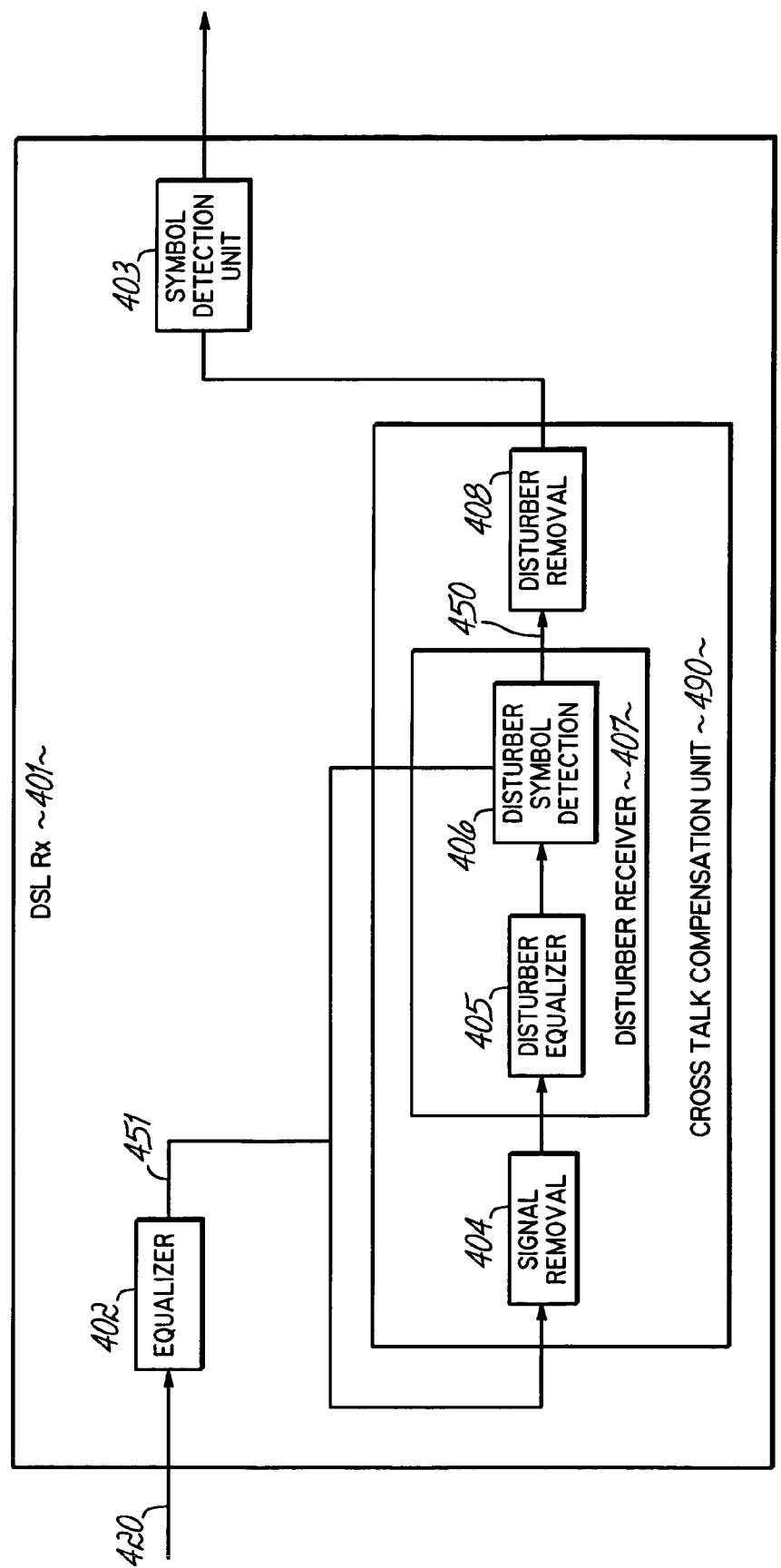
FIG. 4 shows an improved DSL receiver having a cross-talk compensation unit.

Before discussing a methodology for developing a line perspective, the design and operation of an embodiment of a DSL receiver that is able to improve SNR by maintaining a line perspective will first be discussed. FIG. 4 shows an embodiment 401 of a DSL receiver as described just above. The operation of the equalizer 402 and the symbol detection unit 403 of FIG. 4 corresponds to the operation of the equalizer 202 and symbol detection unit 203 as described with respect to FIG. 2.

Figure 2:
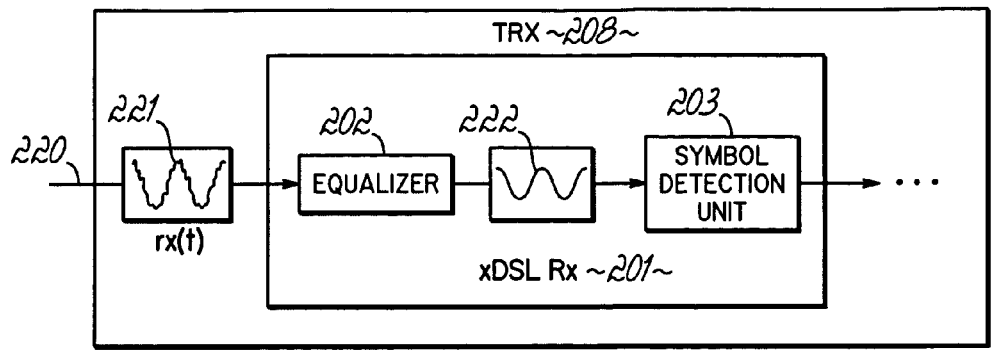
FIG. 2 shows an exemplary DSL receiver within a DSL transceiver.

Comparing the prior art DSL receiver 201 of FIG. 2 with the improved DSL receiver 401 of FIG. 4, note the insertion of a cross-talk compensation unit 490 between the equalizer 402 and the symbol detection unit 403. The cross-talk compensation unit 490 includes a signal removal unit 404, disturber receiver 407 and a disturber removal unit 408. The cross-talk compensation unit 490 removes disturber noise from the received waveform on line 420 prior to the symbol detection that is performed by the symbol detection unit 403. Referring to FIGS. 3a and 4, the signal removal unit 404 and the disturber receiver 407 together represent a channel that provides a representation (e.g., a time domain representation or a frequency domain representation) of one or more disturber signals (e.g., disturber signals d1(t), d2(t), d3(t) of FIG. 3a) to the disturber removal unit 408 at a first disturber removal unit input 450.

The disturber removal unit 408 accepts the disturber signal representation(s) and effectively processes them according to: 1) their corresponding co-channel h1(t), h2(t), h3(t); and 2) the activity of the equalizer 402. This processing produces a representation of the disturber noise as it appears at the output of the equalizer 403. The disturber removal unit 408 then combines (e.g., subtracts) the disturber noise representation with the equalizer 402 output to produce an equalized signal having reduced disturber noise. The equalized signal having reduced disturber noise is then presented to the symbol detection unit 403 so that the signal (i.e., the downstream information sent from the service provider) may be detected.

Recall that the signal removal unit 404 and the disturber receiver 407 together represent a channel that provides a representation (e.g., a time domain representation or a frequency domain representation) of one or more disturber signals (e.g., disturber signals d1(t), d2(t), d3(t) of FIG. 3a) to the disturber removal unit 408 at a first disturber removal unit input 450. The signal removal unit 404 removes those aspects of the equalizer 403 output that correspond to the signal being sent as downstream traffic from the service provider to the receiver 401.

That is, to the extent possible, the output of the signal removal unit 404 corresponds to pure "noise". The disturber receiver 407 includes a disturber equalizer 405 and a disturber symbol detection unit 406. The disturber equalizer 407 attempts to "undo" the activity of the equalizer 203. That is, recall from the discussion in the background that an equalizer (such as equalizer 203 of FIG. 2 or equalizer 403 of FIG. 4) suppresses a channel's noise and/or amplifies it's signal.

In so doing, the equalizer 203 attempts to "whiten" the noise so that it possesses an approximately constant power spectral density over the frequency range of interest. As a result, particularly strong disturber noise frequency components (e.g., a 20–392 KHz band for a symetric DSL service on a neighboring line) will be individually and disproportionately attenuated by the equalizer 203 (as compared to other noise frequency components). The disturber equalizer 405 attempts to reverse this disproportionate attenuation so that the pure spectral components of the disturber noise, as they appear on the line 420 prior to processing by the equalizer 402, are recaptured.

After the original disturber noise power profile is approximately recaptured by the disturber equalizer 405, the disturber symbol detection unit 406 reconstructs or otherwise deduces (to the extent possible), one or more disturber signals (e.g., disturber signals d1($t$), d2($t$), d3($t$) shown in FIG. 3a) as they appear on their respective lines. These are then forwarded to the disturber removal unit 408.

Figure 5:
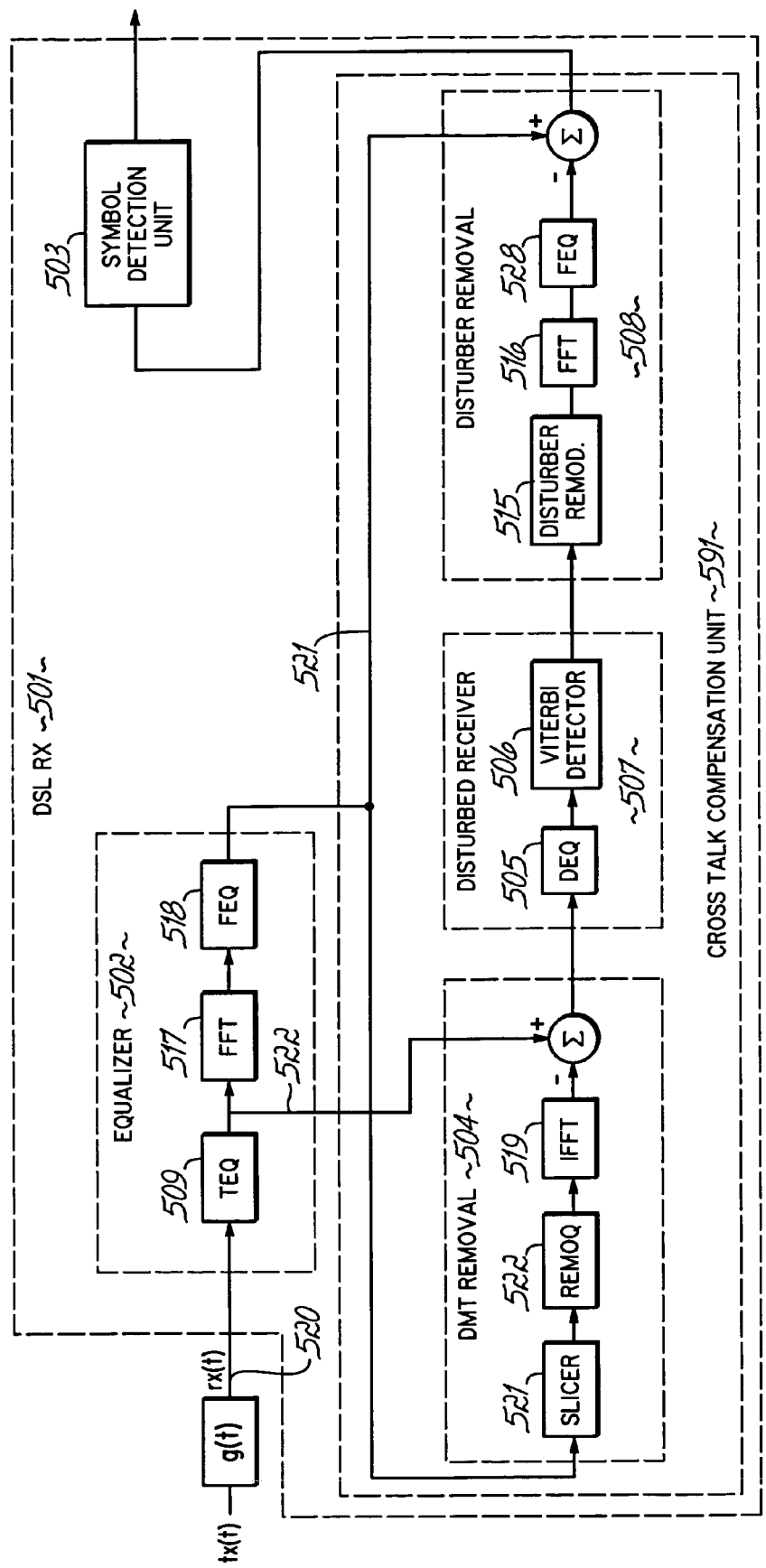
FIG. 5 shows an embodiment of a DMT-ADSL DSL receiver that conforms to the improved DSL receiver approach of FIG. 4.

FIG. 5 shows an exemplary embodiment of a Discrete Multi Tone—Asymmetric Digital Subscriber Line (DMT-ADSL) receiver 501 that conforms to the processing approach just described with respect to FIG. 4. The DMT-ADSL receiver 501 of FIG. 5 includes an equalizer 502 (which corresponds to the equalizer 402 of FIG. 4), a DMT signal removal unit 504 (which corresponds to the signal removal unit 404 of FIG. 4), a disturber receiver 507 (which corresponds to the disturber receiver 407 of FIG. 4), a disturber removal unit 508 (which corresponds to the disturber removal unit 408 of FIG. 4) and a symbol detection unit 503 (which corresponds to the symbol detection unit 403 of FIG. 4).

During a sequence referred to as "line training", the equalizer 502 searches for the signal based upon the type and/or speed of service that is to be received. When the signal is found, the equalizer 502 adjusts an impulse response function profile associated with a time domain equalizer (TEQ) 509. This impulse response function, when convoluted with the received signal rx(t), produces an efficient representation of the received signal rx(t) at the TEQ output 509. Furthermore, the TEQ convolution may also provide (as an ancillary benefit) some degree of noise suppression.

An efficient representation of the received signal rx(t) may be realized by limiting the number of samples used to represent the convolution of the TEQ impulse response with the channel g(t) impulse response. An efficient representation of the received signal rx(t) reduces the processing load presented to the transceiver's processing resources (e.g., a microprocessor or digital signal processor or combination of both) for subsequent processing of the received waveform rx(t).

The fast Fourier transform (FFT) unit 517 converts the efficient representation of the received waveform rx(t) from the time domain to the frequency domain. The frequency domain equalizer (FEQ) 518 searches for and extracts an efficient frequency domain representation of the DMT signal originally transmitted by the service provider tx(t).

The DMT signal removal unit 504 corresponds to the signal removal unit 404 of FIG. 4. As such the output 510 of the DMT signal removal unit 504 corresponds to, to the extent possible, pure "noise". As seen in FIG. 5, a slicer unit 521 detects (within the frequency domain) the DMT signal.

DMT is a modulation scheme that uses a plurality of quadrature amplitude modulated (QAM) sinusoids to transmit digital information. The frequency of each sinusoid is centered within a frequency "bin" (e.g., a frequency band of 4.3125 KHz reserved for its transmission. According to QAM modulation, the phase and amplitude of a sinusoid are modulated to represent the different possible states of the digital bits being transmitted. The number of bits that are transmitted on a line increases with the number of sinusoids that are transmitted and/or the number of different phase and amplitude positions (i.e., bit states) implemented per sinusoid.

The slicer unit 521 effectively determines the phase and amplitude of the received sinusoid(s) in order to extract the symbol information sent by the service provider. Remodulator 522 constructs a DMT signal (as modified by the channel g(t) and the TEQ 509) from this symbol information. The DMT signal is then converted to the time domain by the inverse Fourier transform (IFFT) unit 519. Pure noise is created by subtracting the DMT signal (as presented by the IFFT unit 519) from the equalizer output 522. Pure noise, in this case, may also be referred to as a DMT-compensated signal.

It is important to point out that the receiver approach outlined in FIG. 5 may be used for DSL signals other than a DMT-ADSL signal. That is, the receiver design of FIG. 5 may be tailored for any DSL service provided the proper modulation schemes are accounted for. For example, if the received signal is a Pulse Amplitude Modulated (PAM) signal (as is the case with SDSL signals), the DMT removal unit 504 can be reconfigured as a PAM removal unit if a PAM based slicer 521 is employed. Thus, even though the particular embodiment being discussed with respect to FIG. 5 is limited to a DMT-ADSL application, those of ordinary skill will recognize that the receiver approach of FIG. 5 is actually applicable to DSL services other than DMT-ADSL.

After the DMT signal is removed by the DMT signal removal unit 504, disturber signals are generated by the disturber receiver 507. The disturber receiver 507 includes a disturber equalizer (DEQ) 505 (that corresponds to the disturber equalizer 405 of FIG. 4) and a disturber symbol detector 506 (that corresponds to the disturber symbol detector 406 of FIG. 4). In the embodiment of FIG. 5, the disturber symbol detector employs Viterbi processing techniques and thus may also be referred to as a Viterbi detector 506.

As discussed with respect to the disturber equalizer 405 of FIG. 4, the DEQ 505 attempts to "undo" any noise suppression provided by the equalizer 502. That is, with respect to the design approach of FIG. 5, the DEQ 505 attempts to undo any noise suppression provided by the TEQ 509. Noise suppression from the TEQ may be undone by effectively inversely compensating for the adjustments made by the TEQ (during line training as discussed above) to the TEQ impulse response function profile.

That is, recalling that the TEQ 509 provides noise suppression, if the DEQ 505 impulse response function adjustment is opposite to that of the TEQ 509, the noise suppression provided by the TEQ 509 may be effectively eliminated. As such, at the DEQ 505 output, the disturber noise as it appears on the line has been re-captured.

In an embodiment, the DEQ 505 is designed using minimum-mean-squared-error (MMSE) techniques. The result of this DEQ design is filter coefficients that a yield a filter which effectively counteracts the noise suppression provided by the TEQ 509.

The Viterbi detector 506 of FIG. 5 corresponds to the disturber symbol detector 406 of FIG. 4. As such, the Viterbi detector 506 reconstructs or otherwise deduces (to the extent possible), one or more disturber signals (e.g., disturber signals d1($t$), d2($t$), d3($t$) shown in FIG. 3$a$) as they appear on their respective lines.

For example, if a particular portion of the disturber noise presented by the DEQ 505 is understood to be a PAM-SDSL signal that is cross coupled to the receiver's line 520, the Viterbi detector 506 reconstructs the PAM-SDSL signal on the cross coupled (e.g., nearby) PAM-SDSL line from that portion of the disturber noise. Similarly, if another particular portion of the disturber noise presented by the DEQ 505 is understood to be a second PAM-SDSL signal that is cross coupled to the receiver's line 520, the Viterbi detector 506 may also reconstruct the second PAM-SDSL signal on the second cross coupled (e.g., nearby) PAM-SDSL line from the other portion of the disturber noise.

Note that the association of particular portions of the disturber noise presented by the DEQ 505 with specific types of "nearby" services is an aspect of the line level perspective (discussed with respect to FIG. 3$a$) held by the receiver 501. An exemplary embodiment of how this understanding/perspective is developed is provided in more detail below. The Viterbi detector 506 of FIG. 5 employs Maximum Likelihood Sequence Estimation (MLSE) to reconstruct, from its line level perspective, the particular disturber signal on the cross coupled line.

For example, PAM signals are used to transmit two bits of information via the modulation of a pulse amplitude (e.g., a pulse amplitude of +3 may correspond to 11, a pulse amplitude of +1 may correspond to 10, a pulse amplitude of –1 may correspond to 01, and a pulse amplitude of –3 may correspond to 00). The Viterbi detector 506 employs an MLSE technique to determine whether particular portions of the disturber noise presented by the DEQ 505 (that are understood to be caused by a particular PAM disturber) correspond to a +3, +1, –1, or –3. As such, the particular sequences of +/–3 and +/–1 deduced by the Viterbi detector 506 correspond to a disturber signal on a cross coupled line.

The deduced disturber signal is then presented to the disturber removal unit 508 at the disturber receiver output 550. Other disturber signals that the Viterbi detector 506 is designed to detect are also presented at the disturber receiver output 550. Note that the number of disturber signals that the Viterbi detector 506 is designed to detect is an aspect of the line level perspective held by the receiver 501.

For example, in an embodiment, the number of disturber signals detected by the Viterbi detector are limited (e.g., to 2 or 3 typically) by processing limitations available to the receiver 501. Thus, in such an embodiment, part of the Viterbi design process involves prioritizing which disturbers cause the strongest disturber noise.

After the disturber signals are presented to the disturber removal unit 508, the disturber remodulator 515 effectively passes each disturber signal through an estimation of its corresponding co-channel. That is, referring briefly back to FIG. 3$a$, recall that a line level perspective may include not only an understanding of a disturber signal (e.g., disturber signals d1($t$), d2($t$), and d3($t$)) but also an understanding of the channel (referred to as a co-channel h1($t$), h2($t$), h3($t$)) that the cross-talk passes through in reaching the affected line 320. A discussion of how a co-channel may be estimated for each disturber signal is presented in more detail below.

The disturber remodulator 515 convolves the disturber signals d1($t$), d2($t$), d3($t$) that are received from the disturber detector 507 with the impulse response function of its corresponding co-channel (e.g., h1($t$) for d1($t$), h2($t$) for d2($t$), and h3($t$) for d3($t$)). As a result, a representation of the disturber noise that is produced on the line 520 from these disturbers is created. This representation is then convolved with an impulse response $h_{TEQ}(t)$ that is representative of the equalization provided by the TEQ 509.

As a result, a representation of the disturber noise as it appears at the output of the TEQ 509 is created. This disturber noise representation (which corresponds to the disturber remodulator 515 output) is then converted from the time domain to the frequency domain by an FFT unit 516. The output of the FFT 516 is then multiplied by the FEQ 528 (which may be identical to the FEQ 518). This signal is, to the extent possible, identical to the disturber noise as it is presented at the output of the FEQ 518. By subtracting the output of the FEQ 528 from the FEQ 518 output, the disturbers will be approximately canceled (i.e., removed from the FEQ 518 output). As such, the SNR is enhanced before the symbols on the line 520 are detected by the symbol detection unit. It is important to point out that the receiver 501 approach outlined above should not be construed as limited to the particular frequency domain processing/time domain processing strategy that is displayed in FIG. 5.

B. Development of Line Level Perspective During Line Training

Recall from the discussions above that a line level perspective may be developed that includes: 1) an understanding of the disturber signals that exist on one or more cross coupled lines (e.g., as represented by disturber signals d1($t$), d2($t$), and d3($t$) in FIG. 3$a$) and their corresponding co-channels (e.g., as represented by impulse responses h1($t$), h2($t$), and h3($t$) in FIG. 3$a$).

Figure 6:
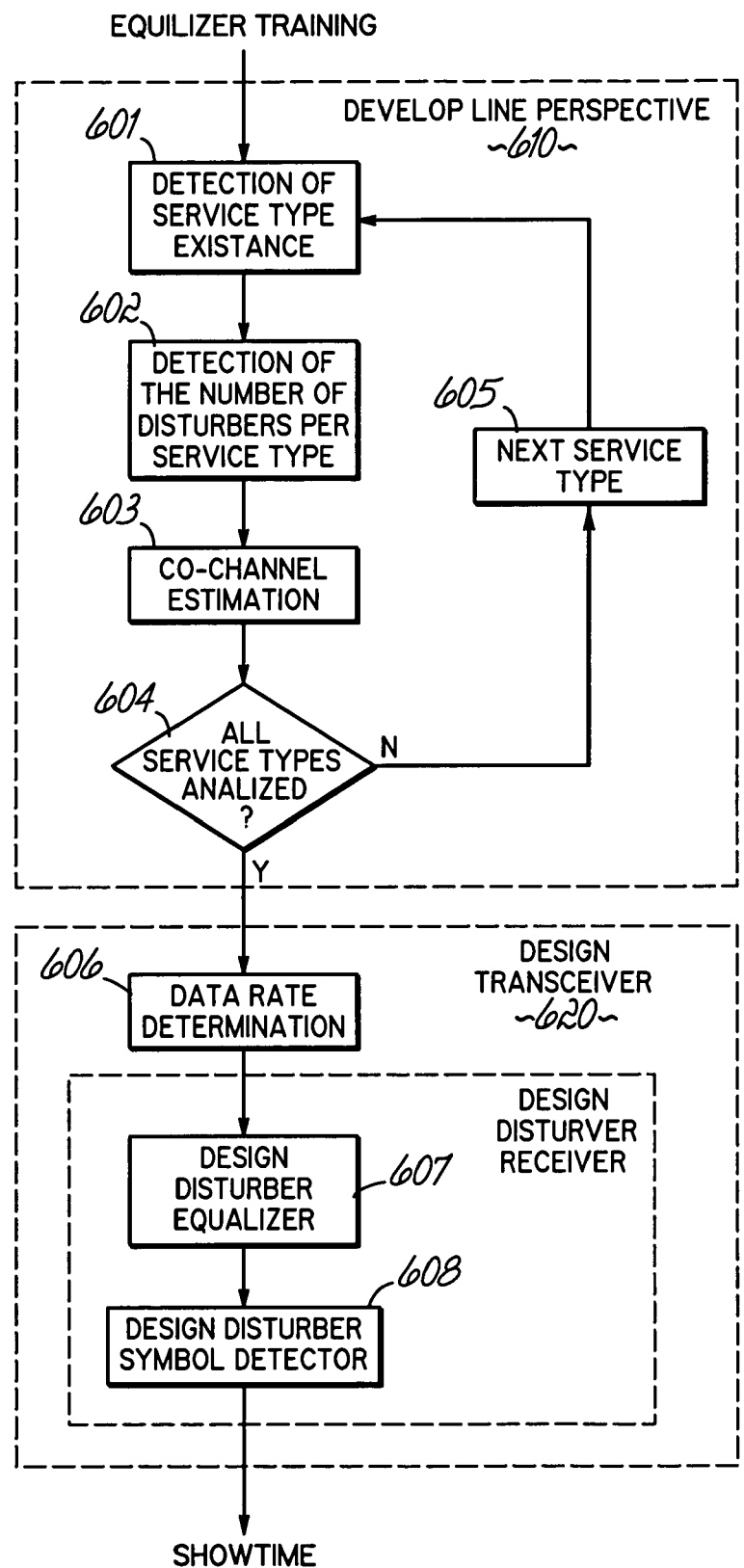
FIG. 6 shows a methodology for developing a line perspective.

FIG. 6 shows a methodology that may be used to develop the line perspective discussed just above. The development of a line perspective (and/or any disturber noise compensation that results) may be referred to as mitigation of disturbers. The development of a line perspective may occur during line training. Line training is a period of time prior to the actual use of the line to transmit a customer's information (referred to as "showtime"). During line training the CPE transceiver responsible for controlling the transmission/reception of upstream/downstream traffic "learns" about the operating environment of the line.

For example as seen in FIG. 6, before showtime occurs, the equalizers (e.g., the TEQ 509 and FEQ 518 of FIG. 5) undergo a training sequence in which the proper adjustments for suppressing the line's noise and/or amplifying the line's signal are established. After the equalizer adjustments are established, the disturber signals and their corresponding co-channels may be identified and/or otherwise characterized 610.

Then, based on the understanding of the disturber signals and their corresponding co-channels: 1) the disturber receiver (e.g., disturber receiver 407 of FIG. 4) is tailored 620 to detect the particular disturber signals chosen for compensation. This process is completed before showtime begins.

Referring to FIG. 6, a disturber signal may be identified or otherwise characterized through its type of service 601.

Said another way, with foresight of the types of services that may cause disturber noise (e.g., T1 or PAM-SDSL on a DMT-ADSL line), certain frequency ranges may be "focused upon" to see if disturber noise exists.

That is, for example, it is known that a T1 signal has a fundamental frequency of approximately 1.5 MHz. By searching across a frequency range centered at 1.5 MHz, the existence (or lack thereof of disturber noise resulting from a cross-coupled T1 line may be confirmed and its exact frequency may be determined. Such a frequency range may be referred to as a "service specific" frequency range.

If disturber noise power (e.g., above a critical threshold to warrant further analysis) is detected for a particular service type, the corresponding frequency range may be further analyzed 602 to see how many disturber signals (i.e., how many cross coupled lines) exist for this type of service. For example, by "refocusing" in the service specific frequency range with a finer resolution bandwidth, each discovered "peak" may be assumed to be caused by a different line (owing to differences in crystal oscillator frequencies used to form the disturber signals). Note that identification of the frequency at which a particular peak occurs corresponds to a further refinement of the line level perspective. That is, not only has the service type for a source of disturbance been identified but also its particular frequency has been identified.

Once the number of disturbers of a particular service type is determined, a model of the spectral content of an ideal disturber signal for each discovered disturber is generated. This ideal disturber signal model may be compared against what is actually observed on the line (i.e., the disturber signal's corresponding disturber noise) to generate 603 an estimation of the disturber signal's co-channel. That is, the co-channel is responsible for (and may be characterized by) the "distortion" that occurs to the disturber signal as it is converted from a disturber signal to disturber noise.

The process described just above is iterated until each of the potential (i.e., foreseen) types of service that can cause disturber noise on the line are analyzed (e.g., when all the service specific frequency ranges have been searched over). Note that the concept of service type may be extended to include any cause of disturber noise. As such the method described above should not be construed as limited only to networking services that exist on an ordinary telephone line. For example, AM radio station carrier frequencies may be searched for any resulting disturbance noise.

Note that once all of the disturber sources and their co-channels have been identified, a complete line level perspective has been developed. That is, the service type and frequency particular to each disturber signal has been identified. Furthermore, the profile particular to each corresponding co-channel has also been identified.

The disturbers are then ranked according to disturber noise power. That is, the highest powered observed disturber noise is ranked first, the second highest powered observed disturber noise is ranked second, etc. As such, a corresponding ranking of disturber signals results. The disturber signals chosen for compensation are taken from the ranking (coextensive with the processing constraints that apply).

The line level perspective is then built 620 into the design of the transceiver. First, because the amount of disturber noise that will be removed is understood, the transceiver can estimate its expected improved SNR and determine 606 an appropriate line speed (or data rate) for the line. Second, the disturber equalizer (e.g., disturber equalizers 405, 505 of FIGS. 4 and 5) is configured 607 to "undo" the equalization of the equalizer (e.g., equalizer 402, 502 of FIGS. 4 and 5) based upon the parameters that setup the equalizer.

Third, the disturber symbol detector is configured 608 to detect the chosen disturber signals according to the particular type of service that have been identified for each disturber. The co-channel for each disturber signal and the impulse response of the equalizer is also made available to the disturber removal unit. This process is completed before showtime.

For examples of the methodologies and apparati discussed just above, see co-pending patent applications entitled "Method and Apparatus for Characterization of Disturbers in Communication Systems", "Method and Apparatus for Mitigation of Disturbers in Communication Systems", "Design & Architecture of an Impairment Diagnosis System for Use in Communication Systems", "Method and Apparatus for Impairment Diagnosis in Communication Systems", "Method and Apparatus for Prediction & Optimization in Impaired Communication Systems" all assigned to the present assignee and filed on an even date herewith.

6.0 Development of Network Perspective

Figure 7:
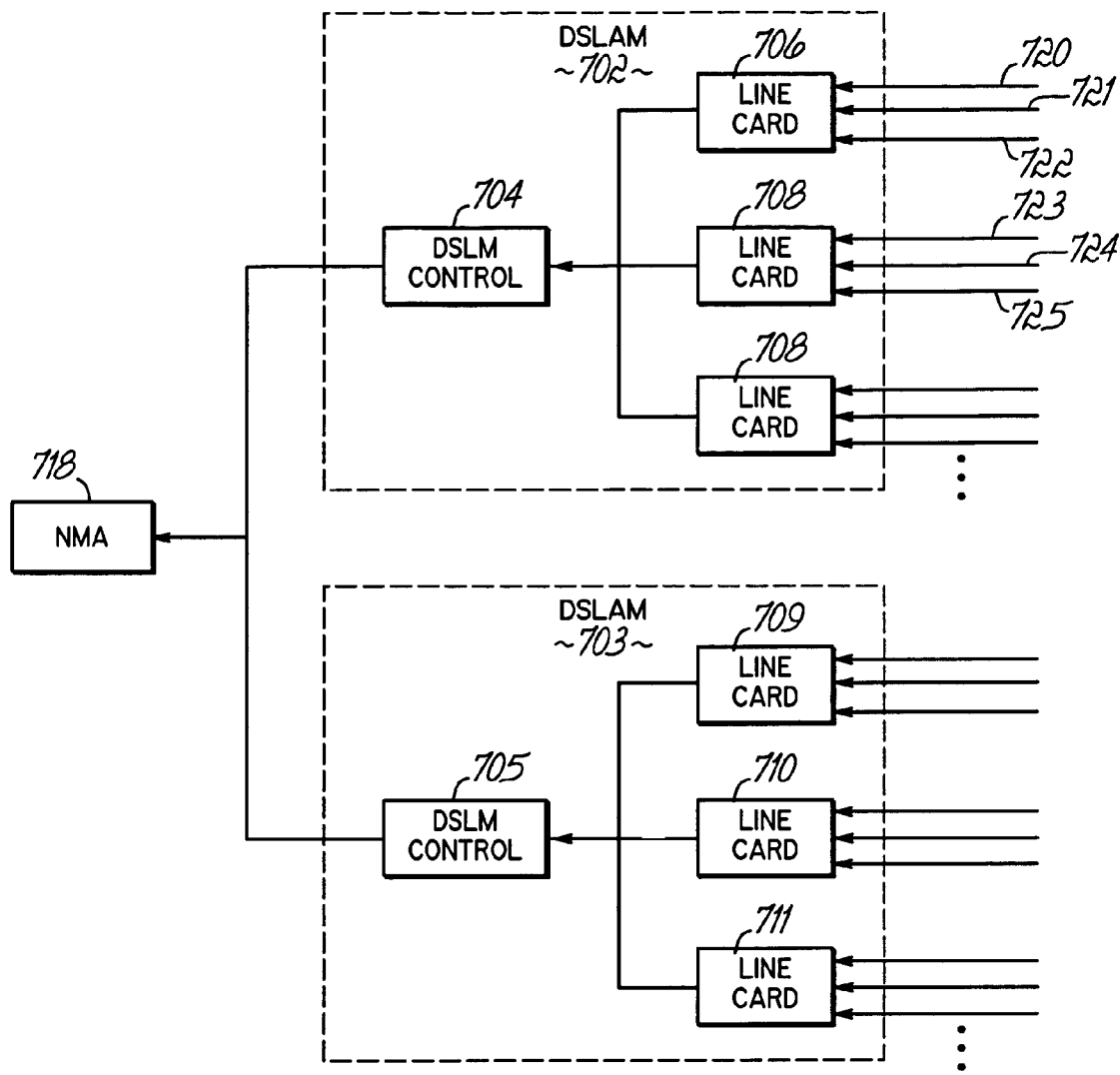
FIG. 7 shows a depiction of event notification flows that may be used to develop a network perspective.

FIG. 7 shows a depiction of event notification flows that may be used to develop a network perspective. Development of a network perspective (and/or any network improvement that results) may be referred to as diagnosis of impairments. Recall from the discussion of FIG. 3b that a network perspective is an understanding of cross-talk (or other interference) as developed through the correlation of events observed on the lines within a network. The cross-talk understanding may be embodied in the form of a "chart" that identifies: 1) which lines are cross coupled with one another; and 2) for each cross coupling that is identified, how strong the particular cross coupling is.

A networking perspective may be developed by designing intelligence at the line level (e.g., within a CPE transceiver) that sends notification of an event upstream to higher layers of the network (such as the NMA 718). For example, an event may be designed to correspond to: 1) an observed change in SNR on a line (or a change in bit error rate or other measurement of signal quality); 2) a change in transmitter signal power on a line as demanded or otherwise permitted by the NMA; and/or 3) a change in transmitted bit rate speed for a line as demanded or otherwise permitted by the NMA. The direction of the event notification flow is indicated by the arrow heads seen in FIG. 7.

In an embodiment, event notifications are sent to and collected by the NMA 718. The NMA "keeps track of" these events and attempts to correlate them with other network events that the NMA is aware of. For example, if the NMA 718 collects event notifications from lines 720, 721 and 722 that each has experienced a drop in SNR just after an increase in the service speed on line 724 was allowed, the NMA 718 can assume that line 724 is the source of disturber noise on lines 720, 721 and 722.

Furthermore, in light of the amount of SNR reduction that has occurred on each line, the NMA 718 can approximate the strength of the cross coupling that exists between line 724 and each of lines 720, 721 and 722. This information may be used, for example, to prevent or limit the extent of further bit rate increases on line 724 (so that proper operation of lines 720, 721 and 722 is ensured).

When event notifications are sent upstream from a CPE transceiver to a line card, the events are collected at the line card that is responsible for communicating with the line that experiences an event. Thus, for example, if line card 706 communicates over lines 720, 721 and 722, line card 706 collects the events from these lines.

An event notification may be time stamped by a transceiver before it is sent upstream or may be time stamped by the line card that receives the event notification. By comparing the timestamps of the collected event notifications, the line card is able to assume that some events are correlated while other events are not correlated. Specifically, those events that occurred at approximately the same time may be deemed as related to one another (e.g., by a cause/effect relationship). For example, if a drop in SNR occurs at approximately the same time on lines 720, 721, 722, the line card may assume that each of these SNR changes had the same cause.

Each line card 706, 707, 708 reports its event notifications (and any correlation it has discovered) to a DSLAM control unit 704. The DSLAM control unit prioritizes and condenses the event information before sending them further upstream to the NMA 718. For example, insignificant events (such as a small change in SNR) may be ignored by the DSLAM control unit 704.

As another example, with respect to DSLAM 702, consider an instance where each line card 706, 707, 708 reports an event that was correlated to each of the line card's lines. If the DSLAM control unit 704 further determines that each of these reports are correlated (e.g., the timestamp of the event reported by each line card 706, 707, 708 are approximately the same), the DSLAM control unit 704 may conclude that a "significant" event has occurred that has affected every line coupled to the DSLAM 702.

The reporting of this event to the NMA may take priority over (i.e., be sent prior to) other events that have already been reported by the line cards but do not correlate to as many lines. Queuing of events at the DSLAM control unit 704 may be employed if the flow of events to be reported exceeds the bandwidth of the communication link between the DSLAM 702 and the NMA 718. The DSLAM control unit 704 may also be configured to condense the event information (e.g., by coupling multiple events in a single message to the NMA) to enhance the efficiency of upstream event notification flow.

The NMA 718 collects the network events sent by the DSLAMS it has control over. The NMA 718 performs a higher level correlation by correlating events reported by different DSLAMs. For any change in SNR caused by an adjustment in line power or line speed within the DSL network, the NMA 718 will be able to get a full report of the lines affected and build an understanding of the cross-talk that exists in the network. Furthermore, specific verification tests may be executed to see if a particular line change is allowable.

For example, if an existing customer desires to increase the speed of his or her service, the service provider can send a higher speed test signal over the line. Depending on the SNR changes to other lines that are caused by the increase in speed, the service provider may permit or deny the increased service. Furthermore, the service provider may continuously run tests during a network's "quiet time" (e.g., in the early morning when the customer population is mostly asleep). By continually running tests (e.g., adjustments in speed and/or power to one or more lines) and continually collecting the events that follow, the NMA 718 can build upon and improve its understanding of the cross-talk that exists between the lines on its network.

For examples of improving an understanding through continued monitoring and analysis of the lines see patent applications entitled "Design and Architecture of an Impairment Diagnosis System for Use in Communication Systems" and "Method and Apparatus for Impairment Diagnosis in Communication Systems" assigned to the present assignee and filed on an even data herewith.

That is, the aforementioned "chart" (that identifies: 1) which lines are cross coupled with one another; and 2) for each cross coupling that is identified, the strength of the particular cross coupling) is continuously refined and improved as to its accuracy. Note that so far the network perspective has been limited to "in domain" lines. In domain lines are lines that the NMA 718 has control over (in terms of being able to adjust their speed or power) and can receive event notifications from.

The NMA 718 may also be able to build an understanding of "out of domain" disturbers (i.e., disturbers that the NMA 718 does not have control over and does not receive event reports from). For example, if a local AM radio station reduces its transmitted power every day after sunset, those in-domain lines that are cross coupled with the AM radio station will report an increase in SNR every day after sunset. The NMA 718 can therefore add to the "chart" the existence of an AM radio station that affects the lines that indicate cross coupling. Various other processes may also be used to identify at least the presence of disturbers originating from lines that are controlled by other service providers.

Other types of diagnosis and analysis reports may be generated, depending upon the application. For instance, in a DSL application, a report may include the type of activity of all diagnosed out-of-domain and in-domain disturbers disturbers and victims that are estimated to be in a given binder. Since twisted pair lines in a binder often terminate in a small geographic area of users, e.g., within several hundred feet, such a report may also provide information regarding services deployed by other carriers in that small geographical area.

Figure 8:
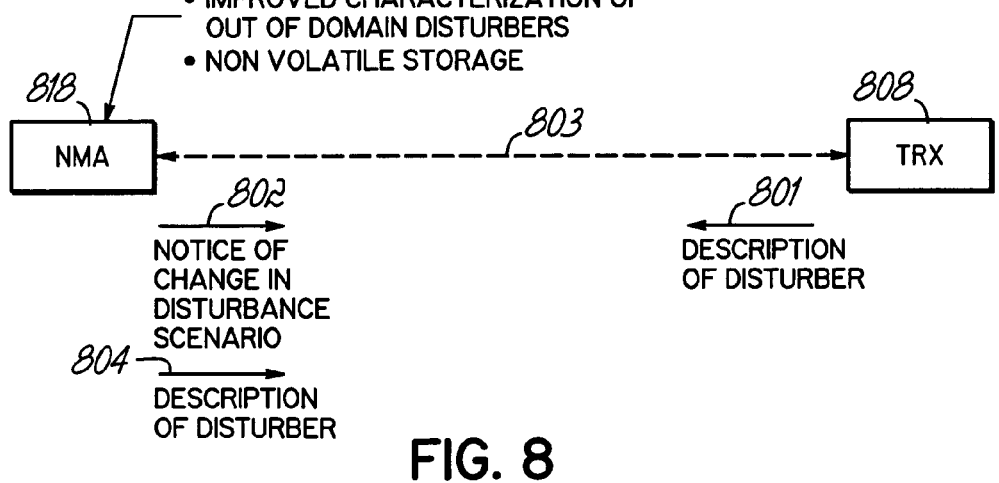
FIG. 8 shows a depiction of information being shared between a line level perspective and a network level perspective.

7.0 Exchange of Information Between a Line Level Perspective and a Networking Level Perspective The discussion that follows demonstrates that transferring line perspective information to a network perspective and/or transferring network perspective information to a line perspective may result in the development of a more accurate perspective and/or increased performance by a DSL network as a whole. For example, referring to FIG. 8, if a description 801 of the disturber sources observed at a line are sent upstream (e.g., to an NMA 818 that also collects event notifications from lines in the network) a number of improvements may be realized.

First, the NMA 718 may develop a more accurate "chart" of lines that are cross coupled. That is, recall that the disturber information gathered during a line perspective development phase (as discussed with respect to FIG. 6) includes: 1) description of the service that the disturber signal corresponds to; 2) the actual frequency of the disturber signal; and 3) an estimate of the co-channel between the line and the cross coupled line carrying the disturber signal.

By sending such a description of one or more disturbers upstream to the NMA 818, the NMA 818 can more readily and with more confidence develop its chart. For example, if the NMA 818 believes (as a result of the event reporting described above with respect to FIG. 7) that a particular line (e.g., line 724 in FIG. 7) causes disturber noise on particular lines (e.g., lines 720, 721, and 722), this belief may be "confirmed" if the victim lines (e.g., lines 720, 721, and 722) each report identical disturber information that match the configuration of the disturber line (e.g., line 724).

That is, if line 724 is configured to deliver a 784 kbps PAM-SDSL service and lines 720, 721 and 722 each send a disturber profile corresponding to a 784 kbps PAM-SDSL service with the same actual frequency, the NMA 818 may establish with a very high degree of confidence that line 724 is cross coupled with lines 720, 721, and 722.

Furthermore, recall that the event reporting scheme discussed above with respect to FIG. 7 allowed the NMA 818 to develop an understanding of the strength of the cross coupling that exists between lines. The accuracy of the coupling strength understanding may be enhanced if the disturber information 801 sent upstream to the NMA 818 also includes a description of a disturber's co-channel. That is, the co-channel provides a thorough description of the cross coupling's dependency on disturber signal frequency. By the event reporting process alone, frequency dependent information is mostly gained by actually changing the operational speed of a line (e.g., via a test signal).

With this collection of information, the network may be better optimized by the service provider. That is, the service provider can predict with improved accuracy the effect that an increase in bit rate or an increase in transmitted power will have on the service provider's other lines. As such, the service provider is more able to correctly allow or deny such increases (if requested by a customer) based upon the actual understood cross coupling that exists among the service provider's lines.

Note that disturber information 801 sent upstream to the NMA may also describe "out-of domain" disturbers. Thus, whereas the event reporting scheme may be limited to realizing only the existence of an "out of domain" disturber, the sending of out of domain disturber information to the NMA 818 allows the NMA 818 to gain a deeper understanding of the out of domain disturber. Specifically, the type of service, the service speed and the co-channel of the out of domain disturber may be understood.

With this information, the NMA may be able to confidently configure networking service arrangements that will not be affected by the out of domain disturber. For example, due to regions of overlapping and non overlapping frequency usage by various DSL services, it is understood that a DMT-ADSL service will interfere (i.e., introduce disruptive disturber noise) with an SDSL service but not with a CAP-ADSL service. As a result, if the NMA 818 gains an understanding from the disturber information 801 (sent from the line perspective) that an out of domain disturber corresponds to a DMT-ADSL service, the NMA 818 may be configured to allow CAP-ADSL service on the victimized lines but not an SDSL service. Similar judgments may be exercised based upon the understood speed of an out of domain disturber and the speed of a desired service or service upgrade that may be offered by the NMA 818.

Furthermore, depending on the presence or absence of non volatile memory within a CPE, additional DSL network enhancement may be gained if the CPE uses the NMA 818 (or other upstream equipment such as a DSLAM or EMS) as an effective non volatile storage unit. That is, a CPE without non volatile storage will lose its line level understanding if its power is turned off. When the CPE is turned on again, the entire line level understanding will have to be re-developed.

However, if the CPE can use the NMA as its non-volatile storage, it may be able to maintain (and even improve) its line perspective. In particular, after the CPE initially builds its line perspective information, it can forward it to the NMA 818 through an upstream management data channel. In the case of DMT-ADSL, this corresponds to an Embedded Operations Channel (EOC).

The NMA 818 can store this line perspective information for later re-transmission, in addition to using it to improve its own network perspective. When that particular CPE is turned on after being turned off, it can request that its line perspective information be sent back to it from the NMA.

By receiving this information, the CPE does not have to devote computational resources to rebuilding its line perspective. Instead, it can use those resources to further refine its line perspective information (e.g., by collecting more data and focusing even more closely on the specific frequencies of the detected disturbers).

Also, if the NMA 818 notices a change in the disturber profile (i.e., if a significant loss in SNR is reported by various lines), the NMA 818 may request any line to "re-develop" its line level understanding. When the subsequent disturber information 801 gathered from the new line understanding is forwarded to the NMA 818, the NMA 818 can search for the cause of the change (e.g., such as a newly introduced out of domain disturber).

Figure 9:
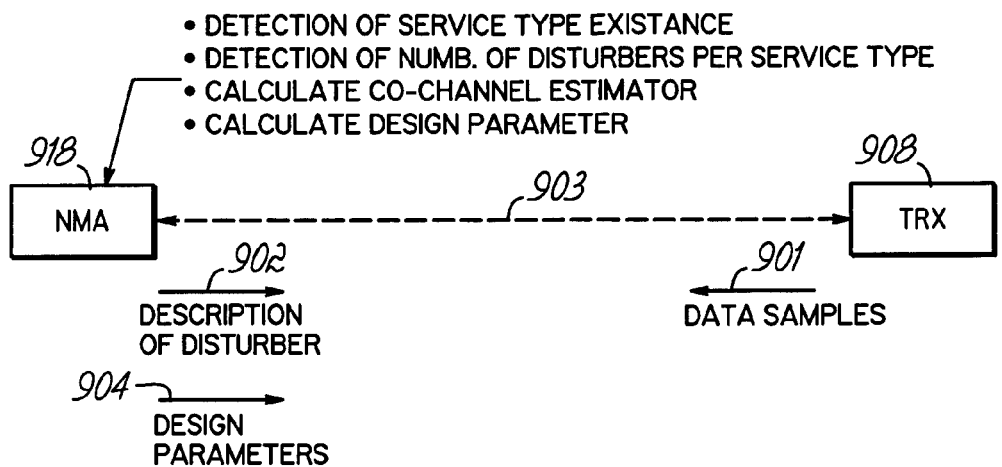
FIG. 9 shows another depiction of information being shared between a line level perspective and a network level perspective.

FIG. 9 relates to another demonstration that transferring line perspective information to a network perspective and/or transferring network perspective information to a line perspective may result in the development of a more accurate perspective and/or increased performance by a DSL network as a whole. In the demonstration of FIG. 9, note that data samples 901 taken from a line are sent upstream to more sophisticated equipment in the network (such as the equipment used to implement the NMA 918, an EMS or a DSLAM).

Referring back to FIG. 6, recall that the transceiver observed the spectral content on its line in order to develop its understanding of the disturbers that affect the line. In the demonstration of FIG. 9, observed spectral content of the line (i.e., data samples 901) is forwarded upstream. Upstream equipment may process these data samples with a methodology the same as, similar to or different from the line perspective development methodology 610 outlined in FIG. 6.

That is, because upstream equipment tends to have more powerful computational resources, a more detailed and accurate analysis of the spectral content on the line may be performed (as compared to the analysis performed at the CPE). For example: 1) a wider service specific frequency range may be used; 2) a narrower resolution bandwidth that searches for a disturber peak may be employed; 3) the entire frequency spectrum (rather than just service specific frequency ranges) may be scanned; 4) a more robust algorithm for detecting the particular service type may be used (e.g., an algorithm that scans for the presence of higher frequency harmonics); 5) a more precise co-channel estimation may be developed, etc. The results of any these analyses will take the form of a more accurate disturber description 902 which is then forwarded back to the line's transceiver.

As an alternate cooperative enhancement, note that the NMA's development of a more detailed and accurate analysis of the spectral content of the line may be used to "pinpoint" to the CPE transceiver precisely where important disturbers are to be found. That is, for example, the disturber information 902 directed to the CPE may be used by the CPE to execute its own (i.e., "local") transceiver training and design routines (e.g., as discussed with respect to FIG. 6). Because the NMA has informed the CPE transceiver "where to look", the CPE transceiver can immediately focus upon one or more disturbers, rather than scan a wide frequency range. More efficient use of training time results (e.g., via improved disturber and co-channel models and/or reduced time spent during training the training period).

Note also that these more advanced disturber descriptions may be made accessible to the NMA, thus at least all of the advantages and improvements discussed above with respect to FIG. 8 may be realized. Furthermore, recall from FIG. 6 that after the line understanding is developed 610 it is built into the design 620 of the transceiver. The more powerful computational resources of the NMA may also be used to calculate more precise design parameters for the disturber equalizer and the disturber symbol detector. The more precise design parameters 904 may be sent back to the CPE transceiver 908 so that they may be integrated into its design.

In particular, the NMA may perform an improved ranking of disturbers, not according to their power, but according to the severity of the impairment that they cause on the victimized line of the CPE. This ranking typically requires much more sophisticated and computationally expensive processing. As a result, a more suitable set of disturbers may be selected for compensation, with a corresponding increase in CPE compensation performance.

Additionally, the NMA may employ much more sophisticated algorithms for computing the optimal filter coefficients for the DEQ. Such algorithms may include least-squares or min-max methods that require more memory than is available on a typical CPE processing resource. This optimized DEQ design results in further improvements in CPE computational performance.

What is claimed is:

1. A method comprising:
   collecting, at a transceiver of a customer premise, data samples of a communication network measured from a DSL;
   the data samples collected including at least one disturber signal and a co-channel corresponding to the at least one disturber signal; and
   sending upstream the collection of data samples measured from the DSL.

2. The method of claim 1 further comprising:
   correlating the data at the transceiver to develop a line perspective.

3. The method of claim 2 wherein:
   the sending includes sending at least a portion of the data from the transceiver to a network access management system.

4. The method of claim 3 further comprising:
   correlating the data from the transceiver with data received at the network access management system from at least one other transceiver to develop a network perspective.

5. The method of claim 4 further comprising:
   sending information from the network perspective of the network access management system downstream to the transceiver of the customer premise.

6. The method of claim 3 wherein:
   the portion of the data from the transceiver is first sent to an access multiplexer and then forwarded from the access multiplexer to the network access management system.

7. The method of claim 2 wherein:
   the sending upstream includes sending the data from the transceiver at the customer premise upstream to an access multiplexer.

8. The method of claim 7 further comprising:
   receiving the data from the transceiver at the access multiplexer; and
   sending at least a portion of the data from the transceiver to a network access management system.

9. The method of claim 8 further comprising:
   correlating the data from the transceiver with data received at the network access management system from at least one other transceiver to develop a network perspective.

10. The method of claim 9 further comprising:
    sending information from the network perspective of the network access management system downstream to the transceiver of the customer premise.

11. The method of claim 1 wherein:
    the at least one disturber signal is a crosstalk signal.

12. The method of claim 1 further comprising:
    correlating the data at the transceiver from a DSL to develop a line perspective that includes a notification of at least one event;
    reporting the notification of the event upstream from the transceiver to a network access management system.

13. A method comprising:
    collecting a notification of at least one event from a transceiver at a line card;
    reporting the notification of the event from the transceiver to a DSLAM control unit; and
    sending the notification from the DSLAM control unit to a network management agent.

14. The method of claim 13 further comprising:
    correlating the event with other events at the line card prior to reporting the notification to the DSLAM control unit.

15. The method of claim 13 wherein the notification of the event is time stamped by the transceiver.

16. The method of claim 13 wherein the notification of the event is time stamped by the line card.

17. The method of claim 13 further comprising:
    correlating the events with other events reported by other line cards at the DSLAM control unit prior to sending the notification to the network management agent.

18. The method of claim 13 further comprising:
    prioritizing the events with other events reported by other line cards at the DSLAM control unit prior to sending the notification to the network management agent.

19. The method of claim 13 further comprising:
    correlating the events with other events reported by other DSLAM control units at the network management agent.

20. The method of claim 13 further comprising:
    prioritizing the events with other events reported by other DSLAM control units at the network management agent.

21. The method of claim 13 further comprising:
    sending information collected by the network management agent from the DSLAM or other DSLAMs down to the transceiver.

22. The method of claim 13 further comprising:
    sending information collected by the network management agent from the DSLAM control unit or other DSLAM control units down to the DSLAM control unit.

23. The method of claim 13 wherein an event is an observed change in a signal-to-noise ratio on a line.

24. The method of claim 13 wherein an event is a change in a bit error rate.

25. The method of claim 13 wherein an event is a change in any measurement of signal quality.

26. The method of claim 13 wherein an event is a change in a transmitter's signal power on a line.

27. The method of claim 13 wherein an event is a change in a transmitted bit rate speed for a line.

28. A method comprising:

collecting data of a communication network at a transceiver of a customer premise, wherein the data being collected is at least one disturber signal and a co-channel corresponding to the at least one disturber signal;

correlating the data at the transceiver to develop a line perspective;

the sending of the data includes sending the data from the transceiver at the customer premise upstream to an access multiplexer;

receiving the data from the transceiver at the access multiplexer;

sending at least a portion of the data from the transceiver to a network access management system;

correlating the data from the transceiver with data received at the network access management system from at least one other transceiver to develop a network perspective; and sending information from the network perspective of the network access management system downstream to the transceiver of the customer premise.

* * * * *

UNITED STATES PATENT AND TRADEMARK OFFICE
CERTIFICATE OF CORRECTION

PATENT NO. : 6,978,015 B1  
APPLICATION NO. : 09/710,579  
DATED : December 20, 2005  
INVENTOR(S) : Mark Alan Erickson et al.

Page 1 of 4

It is certified that error appears in the above-identified patent and that said Letters Patent is hereby corrected as shown below:

Title page,
Item [56], References Cited, OTHER PUBLICATIONS, reads "Alexandra Duel-Hallen et al., IEEE Transactions on Communications, vol. 57, No. 5, May 1989, "Delayed Decision-Feedback Sequence Estimation", pp. 428-436." and should read -- Alexandra Duel-Hallen et al., IEEE Transactions on Communications, vol. 37, No. 5, May 1989, "Delayed Decision-Feedback Sequence Estimation", pp. 428-436. --.
Reads "D. Godard, IEEE Transaction Communications, vol. COM-28, No. 11, Nov. 1980, "Self-Recovery Equalization and Carrier Tracking in Two-Dimensional Data Communication System", pp. 1867-1875." and should read -- D. Godard, IEEE Transaction Communications, vol. COM-28, No. 11, Nov. 1980, "Self-Recovering Equalization and Carrier Tracking in Two-Dimensional Data Communication Systems", pp. 1867-1875. --.
Reads "Lennart Ljung, PTR Prentice Hall Information and System Science Series, "System Identification, Theory for the User", Second Edition, 1999, pp 70-139, 197-279, 317-360." and should read -- Lennart Ljung, PTR Prentice Hall Information and System Sciences Series, "System Identification, Theory for the User", Second Edition, 1999, pp. 70-139, 197-279, 317-360. --.
Reads "Raul A. Cacas et al., Broadcasting & Cable "Current Approaches to Blind Decision Feedback Equalization", Aug. 1999, pp 1-52." and should read -- Raul A. Casas et al., Broadcasting & Cable "Current Approaches to Blind Decision Feedback Equalization", Aug. 1999, pp. 1-52. --.
Reads "John G. Proakis, McGraw Hill Series in Electrical and Computer Engineering, Digital Communications, Third Edition, 1995, pp 267-286." and should read -- John G. Proakis, McGraw Hill Series in Electrical and Computer Engineering, "Digital Communications", Third Edition, 1995, pp. 267-286. --.
Reads "Arthur Gelb et al., "The Analytic Sciences Corporation, Applied Optimal Estimation", 1974, pp 156-179." and should read -- Arthur Gelb et al., The Analytic Sciences Corporation, "Applied Optimal Estimation", 1974, pp. 156-179. --.
"Craig Michael Teuscher," reference, reads "...Electrical Engineering and Computer Sciences, Low Power Receiver Design for Portable RF Applications: Design and Implementation of an Adaptive Multiuser Detector for an Indoor, Wideband CDMA Application, Fall 1998, pp 37, 43-52." and should read -- ...Electrical Engineering and Computer Sciences, "Low Power Receiver Design for Portable RF Applications: Design and Implementation of an Adaptive Multiuser Detector for an Indoor, Wideband CDMA Application", Fall 1998, pp. 37, 43-52. -- .
Reads "K. Sam Shanmugan et al., John Wiley & Sons, "Random Signals, Detection, Estimation and Data Analysis", pp 341-377." and should read -- K. Sam Shanmugan et al., John Wiley & Sons, "Random Signals, Detection, Estimation and Data Analysis", 1988, pp. 341-377. --.

UNITED STATES PATENT AND TRADEMARK OFFICE
CERTIFICATE OF CORRECTION

PATENT NO. : 6,978,015 B1
APPLICATION NO. : 09/710,579
DATED : December 20, 2005
INVENTOR(S) : Mark Alan Erickson et al.

It is certified that error appears in the above-identified patent and that said Letters Patent is hereby corrected as shown below:

OTHER PUBLICATIONS, (cont'd),
Reads "Harry L. Van Trees, Massachusetts Institute of Technology, "Detection Estimation, and Modulation Theory", 1968, pp 19-163, 239-418." and should read -- Harry L. Van Trees, Massachusetts Institute of Technology, "Detection, Estimation, and Modulation Theory", 1968, pp. 19-163, 239-418. --.
Read "Honig, M.L. et al., "Suppression of Near- and Far-End Crosstalk by Linear-Pre- and Post-Filerting", Selected areas in Communications, IEEE Journal on. Vol. 10 Issue 3, Apr. 1992, pp. 614-629, entire document." and should read -- Honig, M.L. et al., "Suppression of Near- and Far-End Crosstalk by Linear Pre- and Post-Filtering", IEEE Journal on Selected Areas in Communications, Vol. 10, Issue 3, Apr. 1992, pp. 614-629, entire document. --.
Reads "Valenti, Craig F., Bellcore, "Cable Crosstalk Parameters and Models", ANSI Contribution IE1.4/97-302 Technical Subcommittee Working Group Members, Spectral Compatibility, Morristown, NJ 07960, USA, Sep. 22, 1997, pp.8." and should read -- Valenti, Craig F., Bellcore, "Cable Crosstalk Parameters and Models", ANSI Contribution TIE 1.4/97-302 Technical Subcommittee Working Group Members, Spectral Compatibility, Morristown, NJ 07960, USA, Sep. 22, 1997, pp.8. --.

Drawings,
Sheet 4, FIG. 5, Box 507, reads "DISTURBED RECEIVER" and should read -- DISTURBER RECEIVER --.
Sheet 5, FIG. 6, Box 601, reads "DETECTION OF SERVICE TYPE EXISTANCE" and should read -- DETECTION OF SERVICE TYPE EXISTENCE --.
Sheet 5, FIG. 6, Box 604, reads "ALL SERVICE TYPES ANALYZED?" and should read -- ALL SERVICE TYPES ANALYZED? --.
Sheet 5, FIG. 6, Box 620, reads "DESIGN DISTURVER RECEIVER" and should read -- DESIGN DISTURBER RECEIVER --.
Sheet 6, FIG. 8, Box 818, reads "NON VOLATILE STORAGE" and should read -- NON-VOLATILE STORAGE --.
Sheet 7, FIG. 9, Box 918, reads "DETECTION OF SERVICE TYPE EXISTANCE" and should read -- DETECTION OF SERVICE TYPE EXISTENCE --.

Column 10,
Line 14, reads "...network technologies other tha DSL (e.g., reless net-..." and should read -- ...network technologies other than DSL (e.g., wireless net-... --.

Column 13,
Line 5, reads "...this DEQ design is filter coefficients that a yield a filter..." and should read -- ...this DEQ design is filter coefficients that yield a filter... --.

UNITED STATES PATENT AND TRADEMARK OFFICE
CERTIFICATE OF CORRECTION

PATENT NO. : 6,978,015 B1
APPLICATION NO. : 09/710,579
DATED : December 20, 2005
INVENTOR(S) : Mark Alan Erickson et al.

It is certified that error appears in the above-identified patent and that said Letters Patent is hereby corrected as shown below:

Column 15,
Line 8, reads "...existence (or lack thereof of disturber noise resuiting from a ..." and should read -- ...existence (or lack thereof) of disturber noise resulting from a ... --.

Column 16,
Line 2 reads "...based upon the parameters that setup the equalizer." and should read -- ...based upon the parameters that set up the equalizer. --.

Column 17,
Line 43, reads "...DSLAMS it has control over. The NMA 718 performs a..." and should read -- ...DSLAMs it has control over. The NMA 718 performs a... --.

Column 18,
Lines 29-30, read, "...of all diagnosed out-of-domain and in-domain disturbers disturbers and victims that are estimated to be in a given..." and should read -- ...of all diagnosed out-of-domain and in-domain disturbers and victims that are estimated to be in a given --.
Lines 44-45, reads, "...as a whole. For example, referring to FIG. 8, if a description 801 of the disturber sources observed at a line are sent..." and should read -- ...as a whole. For example, referring to FIG. 8, if a description 801 of the disturber sources observed at a line is sent... --.
Line 66, reads, "...each report identical disturber information that match the ..." and should read -- ...each report identical disturber information that matches the ... --.

Column 19,
Line 29, reads, "...NMA may also describe "out-of domain" disturbers. Thus,..." and should read
"...NMA may also describe "out-of-domain" disturbers. Thus,... --.
Line 40, reads, "...due to regions of overlapping and non overlapping frequency..." and should read -- ...due to regions of overlapping and non-overlapping frequency... --.
Line 54, reads, "...non volatile memory within a CPE, additional DSL network..." and should read -- ...non-volatile memory within a CPE, additional DSL network... --.
Lines 57-58, reads, "...an effective non volatile storage unit. That is, a CPE without non volatile storage will lose it's line level understanding if..." and should read -- ...an effective non-volatile storage unit. That is, a CPE without non-volatile storage will lose it's line level understanding if... --.

UNITED STATES PATENT AND TRADEMARK OFFICE
CERTIFICATE OF CORRECTION

PATENT NO. : 6,978,015 B1
APPLICATION NO. : 09/710,579
DATED : December 20, 2005
INVENTOR(S) : Mark Alan Erickson et al.

It is certified that error appears in the above-identified patent and that said Letters Patent is hereby corrected as shown below:

Column 20,
Line 51, reads, "...developed, etc. The results of any these analyses will take..." and should read -- ...developed, etc. The results of any of these analyses will take --.
Line 67, reads, "...reduced time spent during training the training period)." and should read -- ...reduced time spent during the training period) --.

Signed and Sealed this

Twenty-seventh Day of June, 2006

JON W. DUDAS
*Director of the United States Patent and Trademark Office*